US012746751B2

(12) United States Patent
Sugiura

(10) Patent No.: US 12,746,751 B2
(45) Date of Patent: Sep. 29, 2026

(54) LIQUID JETTING APPARATUS

(71) Applicant: Brother Kogyo Kabushiki Kaisha, Nagoya (JP)

(72) Inventor: Keita Sugiura, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 92 days.

(21) Appl. No.: 18/975,738

(22) Filed: Dec. 10, 2024

(65) Prior Publication Data

US 2025/0100279 A1 Mar. 27, 2025

Related U.S. Application Data

(63) Continuation of application No. 18/227,571, filed on Jul. 28, 2023, now Pat. No. 12,172,442, which is a (Continued)

(30) Foreign Application Priority Data

Sep. 20, 2017 (JP) ................................ 2017-179822

(51) Int. Cl.
*B41J 2/14* (2006.01)
*B41J 2/175* (2006.01)

(52) U.S. Cl.
CPC ....... *B41J 2/14233* (2013.01); *B41J 2/14209* (2013.01); *B41J 2002/14169* (2013.01); (Continued)

(58) Field of Classification Search
CPC .... B41J 2/14233; B41J 2/14209; B41J 2/175; B41J 2002/14169; B41J 2002/14225; (Continued)

(56) References Cited

U.S. PATENT DOCUMENTS 4,891,654 A 1/1990 Hoisington et al.
7,971,981 B2 7/2011 Nagashima et al.
(Continued)

FOREIGN PATENT DOCUMENTS

CN 103496257 A 1/2014
JP 2007-125798 A 5/2007
(Continued)

OTHER PUBLICATIONS

Sep. 5, 2019—(US) Non-final Office Action—U.S. Appl. No. 16/131,089.

(Continued)

*Primary Examiner* — Lisa Solomon
(74) *Attorney, Agent, or Firm* — Banner & Witcoff, Ltd.

(57) ABSTRACT

A liquid jetting apparatus includes: individual channels; and first and second manifolds commonly provided for the individual channels. Each of the individual channels has: a nozzle; a first pressure chamber connected to the first manifold and extending along a plane orthogonal to a predetermined direction; a second pressure chamber connected to the second manifold and extending along the plane; a first connecting channel connected to the first pressure chamber and extending from the first pressure chamber; a second connecting channel connected to the second pressure chamber and extending from the second pressure chamber; and a link channel extending to be parallel to the plane, having a connected part connected to the first connecting channel and another connected part connected to the second connecting channel, linking the first connecting channel and the second connecting channel, and connected to the nozzle.

9 Claims, 15 Drawing Sheets

Related U.S. Application Data continuation of application No. 17/572,023, filed on Jan. 10, 2022, now Pat. No. 11,752,767, which is a continuation of application No. 16/830,556, filed on Mar. 26, 2020, now Pat. No. 11,298,942, which is a continuation of application No. 16/131,089, filed on Sep. 14, 2018, now Pat. No. 10,632,750.

(52) U.S. Cl.
CPC ................. *B41J 2002/14225* (2013.01); *B41J 2002/14258* (2013.01); *B41J 2002/14419* (2013.01); *B41J 2002/14459* (2013.01); *B41J 2002/14483* (2013.01); *B41J 2002/14491* (2013.01); *B41J 2/175* (2013.01); *B41J 2202/11* (2013.01); *B41J 2202/12* (2013.01)

(58) Field of Classification Search
CPC .... B41J 2002/14258; B41J 2002/14419; B41J 2002/14459; B41J 2002/14483; B41J 2002/14491; B41J 2202/11; B41J 2202/12; B41J 2/01
See application file for complete search history.

(56) References Cited

U.S. PATENT DOCUMENTS

| | | | |
|---|---|---|---|
| 8,328,338 B2 | 12/2012 | Worsman et al. | |
| 9,919,521 B2 | 3/2018 | Nakamura et al. | |
| 2008/0180469 A1 | 7/2008 | Katayama | |
| 2008/0238980 A1 | 10/2008 | Nagashima | |
| 2010/0001095 A1 | 1/2010 | Matsumoto et al. | |
| 2011/0316918 A1* | 12/2011 | Nagashima | B41J 2/14233 347/12 |
| 2012/0092417 A1 | 4/2012 | Kumagai | |
| 2013/0321530 A1 | 12/2013 | Taga et al. | |
| 2014/0078224 A1 | 3/2014 | Park et al. | |
| 2016/0059566 A1 | 3/2016 | Nakamura et al. | |
| 2017/0087865 A1 | 3/2017 | Yoshida et al. | |
| 2017/0157924 A1 | 6/2017 | Otome et al. | |
| 2017/0239949 A1 | 8/2017 | Yoshida | |
| 2018/0201019 A1 | 7/2018 | Seto et al. | |
| 2018/0264837 A1 | 9/2018 | Matsuo et al. | |
| 2019/0329559 A1 | 10/2019 | Ozawa | |

FOREIGN PATENT DOCUMENTS

| | | |
|---|---|---|
| JP | 2008-074034 A | 4/2008 |
| JP | 2008-254196 A | 10/2008 |
| JP | 2009-208445 A | 9/2009 |
| JP | 2011-051154 A | 3/2011 |
| JP | 2011-245795 A | 12/2011 |
| JP | 2012-086375 A | 5/2012 |
| JP | 2014-061695 A | 4/2014 |
| JP | 5686464 B2 | 3/2015 |
| JP | 2016-049672 A | 4/2016 |
| JP | 2017-105079 A | 6/2017 |
| JP | 2017-105167 A | 6/2017 |
| JP | 2017-124600 A | 7/2017 |
| JP | 2017-144660 A | 8/2017 |
| JP | 2018-114713 A | 7/2018 |
| WO | 2007/116699 A1 | 10/2007 |
| WO | 2016/114396 A1 | 7/2016 |

OTHER PUBLICATIONS

Jan. 22, 2020—(US) Notice of Allowance—U.S. Appl. No. 16/131,089.
Nov. 17, 2020—(CN) Notification of First Office Action—App 201811066302.3.
Jul. 27, 2021—(JP) Notice of Reasons for Refusal—App 2017-179822.
May 27, 2021—(US) Non-final Office Action—U.S. Appl. No. 16/830,556.
Nov. 16, 2021—(US) Notice of Allowance—U.S. Appl. No. 16/830,556.
Sep. 20, 2021—(US) Notice of Allowance—U.S. Appl. No. 16/830,556.
Dec. 23, 2022—(US) Non-Final Office Action—U.S. Appl. No. 17/572,023.
Feb. 1, 2022—(JP) Notice of Reasons for Refusal—App 2017-179822.
Jan. 4, 2022—(JP) Notice of Reasons for Refusal—App 2017-179822.
Apr. 5, 2023—(US)—Notice of Allowance—U.S. Appl. No. 17/572,023.
Jul. 25, 2023—(JP) Notice of Reasons for Refusal—App 2022-129558.
Nov. 14, 2023—(JP) Notice of Reasons for Refusal—App 2022-129558.
Aug. 21, 2024 (US)—Notice of Allowance—U.S. Appl. No. 18/227,571.
Mar. 30, 2024—(JP) Decision of Refusal—App 2022-129558.
Mar. 20, 2024—(US)—Non-final Office Action—U.S. Appl. No. 18/227,571.
Global dossier search (Year: 2023).
IP.com search (Year: 2019).
IP.com search (Year: 2021) Sep. 9, 2021.
IP.com search (Year: 2022) Dec. 17, 2022.

* cited by examiner

LIQUID JETTING APPARATUS

REFERENCE TO RELATED APPLICATIONS

The present application is a continuation of U.S. patent application Ser. No. 18/227,571 filed Jul. 28, 2023, which is a continuation of U.S. patent application Ser. No. 17/572,023 filed Jan. 10, 2022, issued as U.S. Pat. No. 11,752,767 on Sep. 12, 2023, which is a continuation of U.S. patent application Ser. No. 16/830,556 filed Mar. 26, 2020, issued as U.S. Pat. No. 11,298,942 on Apr. 12, 2022, which is a continuation of U.S. patent application Ser. No. 16/131,089 filed Sep. 14, 2018, issued as U.S. Pat. No. 10,632,570 on Apr. 28, 2020, which claims priority from Japanese Patent Application No. 2017-179822, filed on Sep. 20, 2017, the disclosure of which is incorporated herein by reference in its entirety.

BACKGROUND ART

Field of the Invention

The present invention relates to a liquid jetting apparatus configured to jet liquid from nozzles.

Description of the Related Art

There is known a recording head having a structure where pressure chambers extend along one plane and their ends at one side are connected to nozzle channels. The nozzle channels extend downward from the connected parts with the pressure chambers, and their lower ends are connected to the nozzles. Further, the ends of the pressure chambers at the other side are connected to a common channel. Further, in such a recording head, a circulation channel connects lower ends of two adjacent nozzle channels with each other. Then, by providing pressure difference to two pressure chambers, from the high pressure chamber to the low pressure chamber, ink is circulated to the low pressure chamber through the nozzle channel and the circulating channel.

DESCRIPTION

Summary

In this recording head, when the ink is circulated as described above, air bubbles may come into the nozzle channels from the nozzles. If there are air bubbles left in pressure chambers, nozzle channels, circulation channels, and the like, then variation is liable to arise in the jetting characteristics of the ink from the nozzles when the recording head is driven. Therefore, it is necessary to let a flow-in air bubble flow to the low pressure chamber through the circulation channel and/or nozzle channel and, furthermore, flow out to the common channel from the pressure chamber. On this occasion, if a diameter of the air bubble is small enough as compared to the height of the pressure chamber, then the air bubble will not get stuck in the connected part between the nozzle channel and the pressure chamber, and will flow from the nozzle channel to the pressure chamber. On the other hand, if the diameter of the air bubble is large enough as compared to the diameter of connected part of the nozzle channel with the pressure chamber, then the air bubble will completely block the connected part between the nozzle channel and the pressure chamber. Therefore, as the ink attempts to circulate, a pressure difference between the nozzle channel and the pressure chamber deforms the air bubble, and this causes the air bubble to flow from the nozzle channel to the pressure chamber. However, for example, if the diameter of the air bubble is only a little larger than the height of the pressure chamber, then the air bubble will get stuck in the connected part between the nozzle channel and the pressure chamber, but will not completely block the connected part. On this occasion, the ink flows through a part, of the connected part, which is not blocked by the air bubble. Therefore, the pressure difference does not arise sufficiently between the nozzle channel and the pressure chamber and thus the air bubble sometimes remains stuck in the connected part between the nozzle channel and the pressure chamber.

An object of the present teaching is to provide a liquid jetting apparatus in which the liquid is circulated and which is possible to reliably discharge the air bubble having flowed in from the a nozzle.

According to an aspect of the present teaching, there is provided a liquid jetting apparatus, including: individual channels; a first manifold commonly provided for the individual channels; and a second manifold commonly provided for the individual channels. Each of the individual channels has: a nozzle; a first pressure chamber connected to the first manifold and extending along a plane orthogonal to a predetermined direction; a second pressure chamber connected to the second manifold and extending along the plane; a first connecting channel connected to the first pressure chamber and extending from the first pressure chamber; a second connecting channel connected to the second pressure chamber and extending from the second pressure chamber; and a link channel extending to be parallel to the plane, having a connected part connected to the first connecting channel and another connected part connected to the second connecting channel, linking the first connecting channel and the second connecting channel, and connected to the nozzle. A position of the link channel in the predetermined direction is different from positions of the first pressure chamber and the second pressure chamber in the predetermined direction. Liquid flows from the first pressure chamber to the second pressure chamber through the link channel. The nozzle is arranged between the connected part connected to the first connecting channel and the another connected part connected to the second connecting channel in a direction in which the link channel extends. The first pressure chamber and the second pressure chamber are long in a first direction parallel to the plane, and a length of the first pressure chamber in the first direction is the same as a length of the second pressure chamber in the first direction.

DESCRIPTION OF THE EMBODIMENTS

First Embodiment

A first embodiment of the present teaching will be explained below.

<Overall Configuration of Printer>

Figure 1:
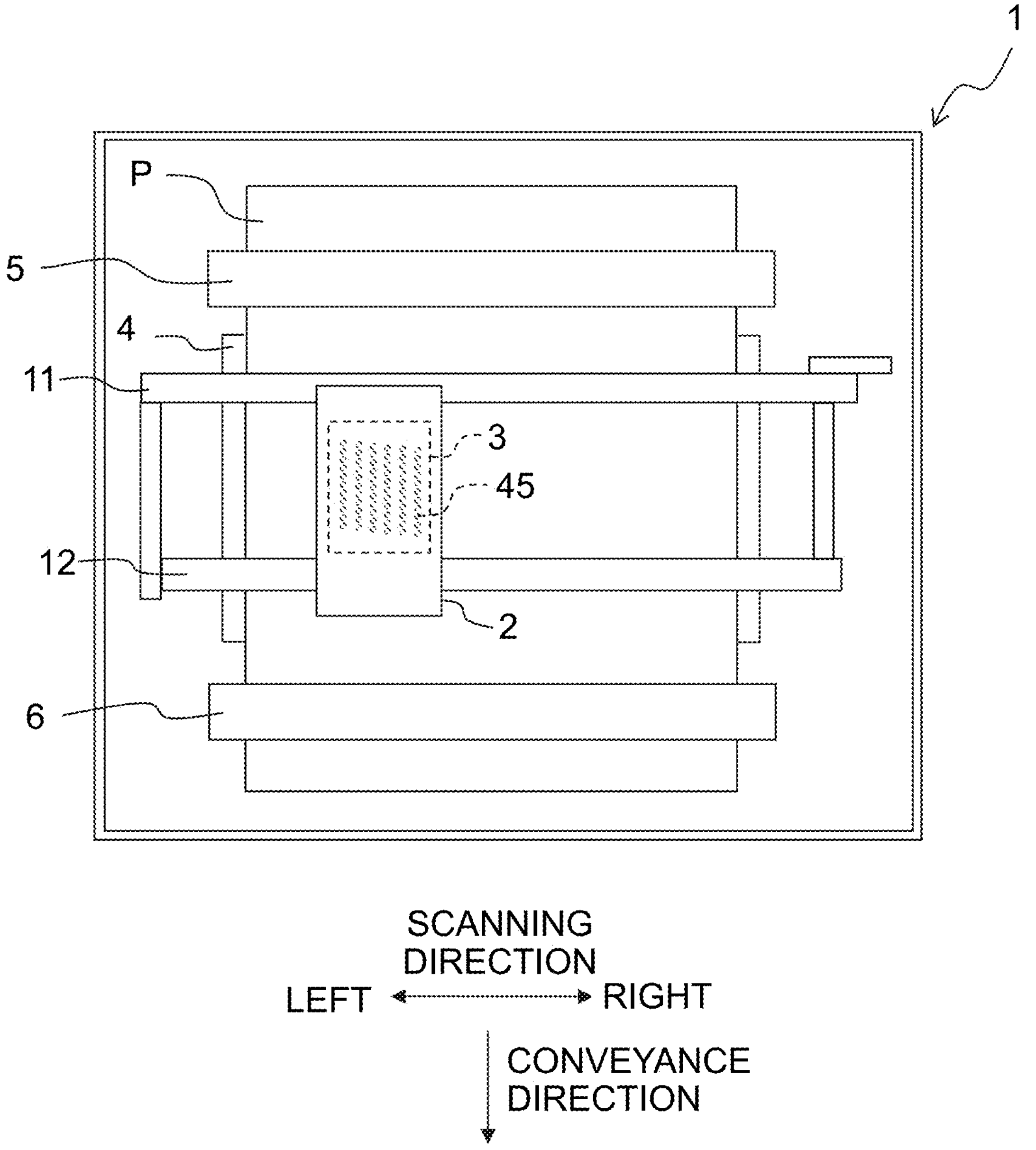
FIG. 1 is a schematic configuration diagram of a printer according to a first embodiment of the present teaching.

As depicted in FIG. 1, a printer 1 according to a first embodiment of the present teaching includes a carriage 2, an ink jet head 3 (the "liquid jetting apparatus" of the present teaching), a platen 4, and conveyance rollers 5 and 6.

The carriage 2 is supported by two guide rails 11 and 12 extending in a scanning direction to move in the scanning direction along the guide rails 11 and 12. Further, as depicted in FIG. 1, the following explanation will be made with the right side and the left side being defined along the scanning direction.

The ink jet head 3 is mounted on the carriage 2 to move together with the carriage 2 in the scanning direction. Further, the ink jet head 3 jets an ink from a plurality of nozzles 45 formed in its lower surface. Further, a detailed explanation will be made later on about the ink jet head 3.

The platen 4 is arranged to face the lower surface of the ink jet head 3 and to extend across the entire length of recording paper P along the scanning direction. The platen 4 supports the recording paper P from below. The conveyance rollers 5 and 6 are arranged respectively at the upstream side and the downstream side with respect to the carriage 2 along a conveyance direction orthogonal to the scanning direction, to convey the recording paper P in the conveyance direction.

Then, the printer 1 carries out printing on the printing paper P by causing the conveyance rollers 5 and 6 to convey the recording paper P through a predetermined distance and, each time the recording paper P is conveyed, moving the carriage 2 in the scanning direction while jetting the ink from the plurality of nozzles 45 of the ink jet head 3.

<Ink Jet Head>

Figure 2:
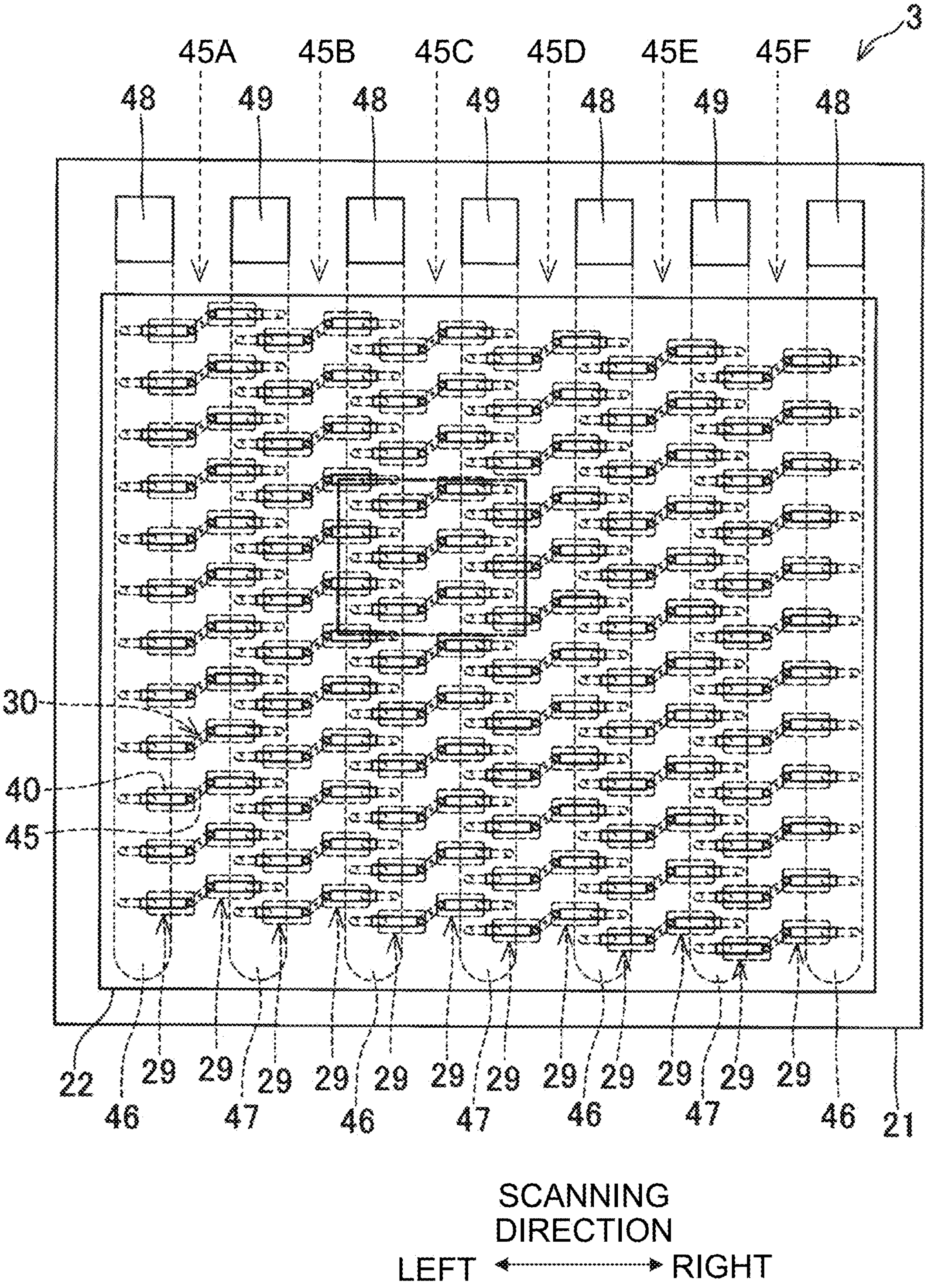
FIG. 2 is a plan view of an ink jet head according to the first embodiment.
Figure 3:
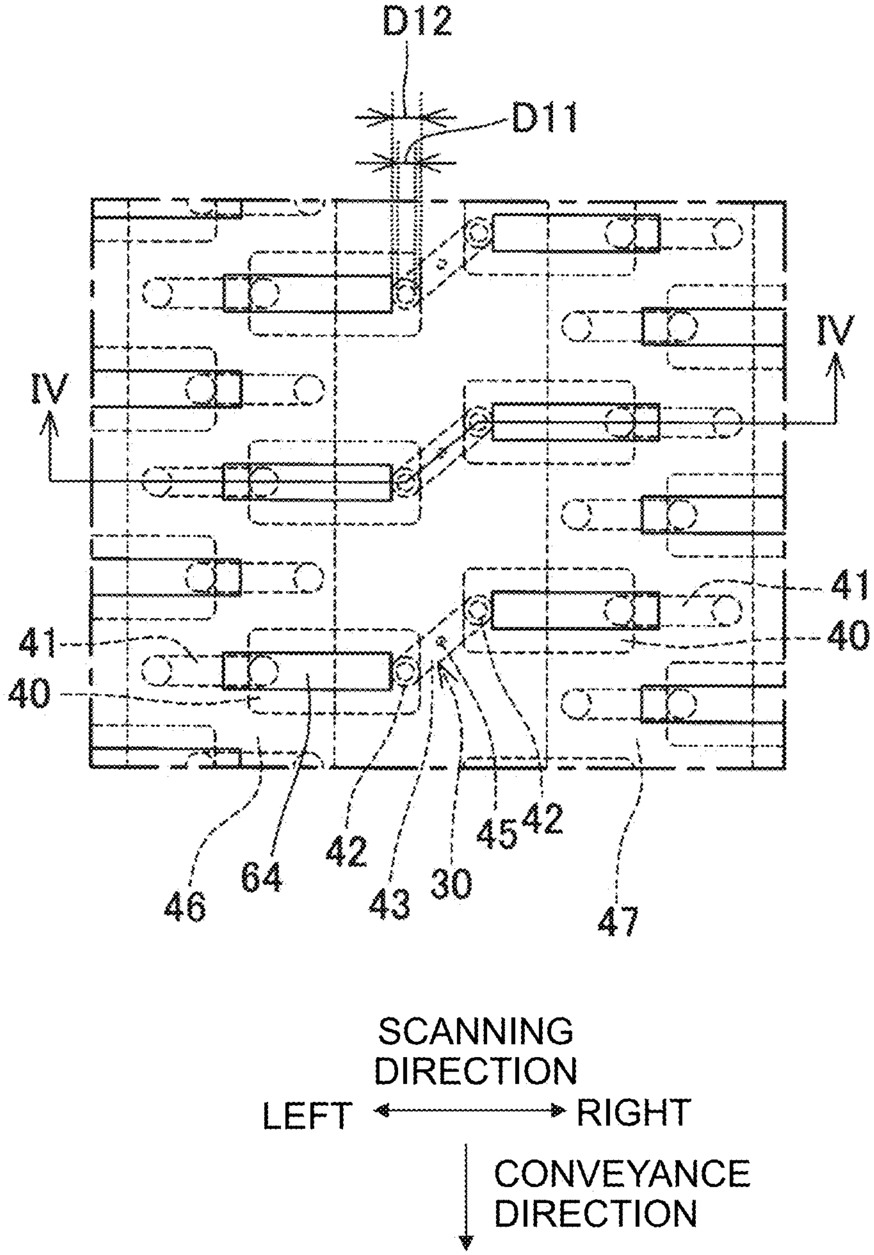
FIG. 3 is an enlarged view of a part encircled with a chain line in FIG. 2.
Figure 4:
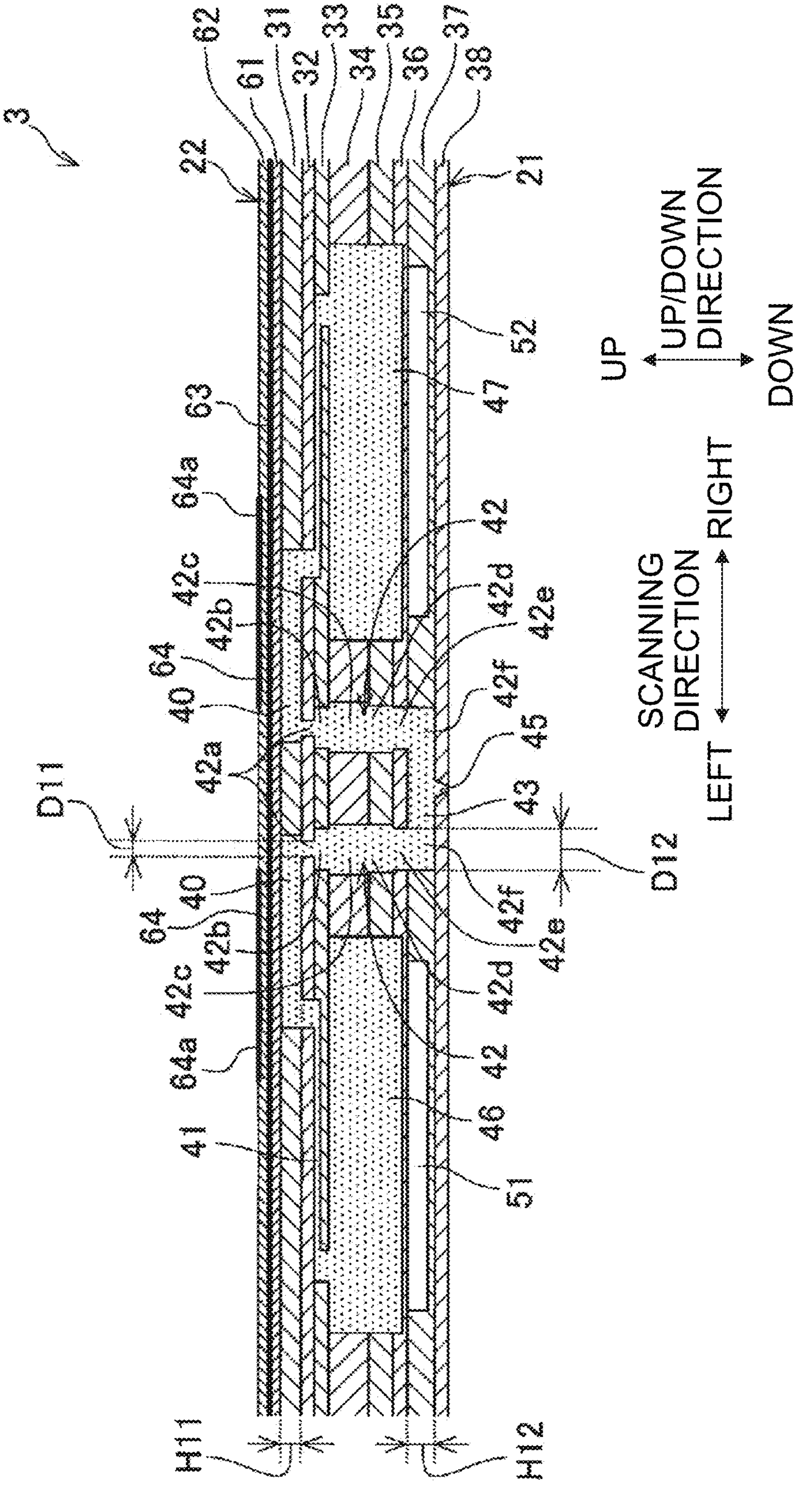
FIG. 4 is a cross-sectional view along the line IV-IV of FIG. 3.

Next, the ink jet head 3 will be explained in detail. As depicted in FIGS. 2 to 4, the ink jet head 3 includes a channel unit 21 formed with ink channels such as the nozzles 45, aftermentioned pressure chambers 40 and the like, and a piezoelectric actuator 22 applying pressure to the ink inside the pressure chambers 40.

<Channel Unit>

As depicted in FIG. 4, the channel unit 21 is formed by stacking eight plates 31 to 38 from above in the order of the plate numbers. The channel unit 21 is formed therein with the plurality of pressure chambers 40, a plurality of throttle channels 41, a plurality of descender channels 42 (the "connecting channel" of the present teaching), a plurality of link channels 43 (the "circulation channel" of the present teaching), the plurality of nozzles 45, four supply manifolds 46 (the "first manifold" of the present teaching), three feedback manifolds 47 (the "second manifold" of the present teaching).

The plurality of pressure chambers 40 are formed in the plate 31 (the "first plate" of the present teaching). As depicted in FIGS. 2 to 4, each of the pressure chambers 40 has an approximately rectangular planar shape with the scanning direction as its longitudinal direction. That is, the pressure chambers 40 extend along a flat surface parallel to the scanning direction and the conveyance direction. Further, the plurality of pressure chambers 40 are arrayed in the conveyance direction to form pressure chamber rows 29. Further, twelve of the pressure chamber rows 29 are aligned along the scanning direction in the plate 31. Further, between the pressure chamber rows 29, the pressure chambers 40 deviate in position along the conveyance direction. Further, in the first embodiment, such pressure chambers 40, among the plurality of pressure chambers 40, as forming the first, fourth, fifth, eighth, ninth, and twelfth pressure chamber rows 29 from the left, and being connected to the supply manifolds 46 through the throttle channels 41 as will be described later on correspond to the "first pressure chamber" of the present teaching. Further, the pressure chambers 40 forming the second, third, sixth, seventh, tenth, and eleventh pressure chamber rows 29 from the left, and being connected to the feedback manifolds 47 through the throttle channels 41 as will be described later on correspond to the "second pressure chamber" of the present teaching.

As depicted in FIG. 4, the plurality of throttle channels 41 are formed across the plates 32 and 33. Each of the pressure chambers 40 is provided individually with a throttle channel 41. The throttle channels 41 provided for the pressure chambers 40 forming an odd numbered row from the left are connected to the left ends of the pressure chambers 40 and extend leftward from the connected parts with the pressure chambers 40. The throttle channels 41 provided for the pressure chambers 40 forming an even numbered row from the left are connected to the right ends of the pressure chambers 40 and extend rightward from the connected parts with the pressure chambers 40.

The plurality of descender channels 42 are formed of overlapping through holes 42*a* to 42*f* formed in the plates 32 to 37 in the up/down direction (the "predetermined direction" of the present teaching). Each of the pressure chambers 40 is provided individually with a descender channel 42. The descender channels 42 provided for the pressure chambers 40 forming an odd numbered row from the left are connected to the right ends of the pressure chambers 40 and extend downward from the connected parts with the pressure chambers 40. The descender channels 42 provided for the pressure chambers 40 forming an even numbered row from the left are connected to the left ends of the pressure chambers 40 and extend downward from the connected parts with the pressure chambers 40. Further, in the first embodiment, each of the plurality of descender channels 42 connected to the pressure chambers 40 (the first pressure chamber) forming the first, fourth, fifth, eighth, ninth, and twelfth pressure chamber rows 29 from the left corresponds to the "first connecting channel" of the present teaching. Each of the descender channels 42 connected to the pressure chambers 40 (the second pressure chamber) forming the second, third, sixth, seventh, tenth, and eleventh pressure chamber rows 29 from the left corresponds to the "second connecting channel" of the present teaching.

Further, among the through holes 42*a* to 42*f* forming the descender channels, the diameter D11 of the through hole 42*a* (an example of the "throttle" of the present teaching) formed in the plate 32 (the "second plate" of the present teaching) is smaller than the height H11 (the "length along the predetermined direction" of the present teaching) of the pressure chambers 40. On the other hand, the diameters of the through holes 42*b* to 42*f* formed in the plate 33 (the "third plate" of the present teaching) to the plate 37 are larger than the diameter D11 of the through hole 42*a*. By virtue of this, the diameter D11 of such part of the descender channels 42 as connected to the pressure chambers 40 is smaller than the height H11 of the pressure chambers 40, such that the diameters spread in the part positioned below the connected part with the pressure chambers 40 (the part at the far side from the pressure chambers 40). Further, when projected in the up/down direction, the edge of the through hole 42*a* is positioned inside of the edges of the pressure chambers 40. That is, when projected in the up/down direction, the through hole 42*a* stays within the range of the arranged pressure chambers 40 and does not extend out from the pressure chamber 40.

The plurality of link channels 43 are formed in the plate 37. The link channels 43 extend horizontally in a direction inclined with respect to both the scanning direction and the conveyance direction, to connect the through hole 42*f* forming the descender channel 42 connected to the pressure chambers 40 forming one of two adjacent pressure chamber rows 29 and the through hole 42*f* of the descender channel 42 connected to the pressure chambers 40 forming the other of the pressure chamber rows 29. In the first embodiment, the plate 37 is formed with the part to become the through hole 42*f* of the above two descender channels 42, and the through hole integrally formed with the link channel 43. Further, the height H12 of the link channel 43 is smaller than the diameter D12 of the through hole 42*f* (the part of the descender channels 42 connected to the link channel 43). Further, when projected in the extending direction of the link channel 43, the link channel 43 stays within the range of the arranged through hole 42*f* and does not extend out from the through hole 42*f*. Further, in the first embodiment, the lower end (the lower edge) of the link channel 43 and the lower ends (the lower edges) of the descender channels 42 are all formed of the upper surface of the plate 38. By virtue of this, when the link channel 43 is projected in the extending direction, the lower edge of the link channel 43 overlaps with the lower edges of the descender channels 42.

Then, in the ink channels explained above, each individual channel 30 is formed from one nozzle 45, one link channel 43 connected to that nozzle 45, two descender channels 42 connected to that link channel 43, two pressure chambers 40 connected to those two descender channels 42, and two throttle channels 41 connected to those two pressure chambers 40.

The plurality of nozzles 45 are formed in the plate 38. Each of the link channels 43 is provided individually for a nozzle 45 which is connected to a central portion of the link channel 43. As depicted in FIG. 2, the plurality of nozzles 45 form six nozzle rows 45A to 45F arranged in the scanning direction. Each of the six nozzle rows 45A to 45F extends in the conveyance direction. Then, the six nozzle rows 45A to 45F deviate downstream in position along the conveyance direction in the order from the leftmost nozzle row 45A.

Four supply manifolds 46 are formed by vertically overlapping the through holes formed in the plates 34 and 35 with the recesses formed in an upper part of the plate 36. The four supply manifolds 46 extend respectively in the conveyance direction to align in the scanning direction at intervals. Then, the four supply manifolds 46 are connected respectively with the ends of the throttle channels 41 at the far side from the pressure chambers 40, the throttle channels 41 being connected to the pressure chambers 40 forming the first, fourth, fifth, eighth, ninth, and twelfth pressure chamber rows 29 from the left. Further, each of the supply manifolds 46 is provided with an ink supply port 48 in its upstream end portion along the conveyance direction. Then, the ink supply ports 48 are connected to an undepicted ink tank such that the ink retained in the ink tank is supplied from the ink supply ports 48 to the supply manifolds 46. Then, in the supply manifolds 46, the ink flows from upstream to downstream along the conveyance direction to supply the individual channels 30 (the throttle channels 41).

The three feedback manifolds 47 are formed by vertically overlapping the through holes formed in the plates 34 and 35 with the recesses formed in the upper part of the plate 36. Each of the three feedback manifolds 47 extends in the conveyance direction and is arranged between adjacent supply manifolds along the scanning direction. Then, the three feedback manifolds 47 are connected respectively with the ends of the throttle channels 41 at the far side from the pressure chambers 40, the throttle channels 41 being connected to the pressure chambers 40 forming the second, third, sixth, seventh, tenth, and eleventh pressure chamber rows 29 from the left. Further, each of the feedback manifolds 47 is provided with an ink discharge port 49 in its upstream end portion along the conveyance direction. The ink discharge ports 49 are connected to the undepicted ink tank. Then, the ink flows into the feedback manifolds 47 from the individual channels 30 (the throttle channels 41), flows from upstream to downstream along the conveyance direction, and flows out of the ink discharge ports 49. The ink having flowed out of the ink discharge ports 49 is returned or fed back to the undepicted ink tank. That is, in the first embodiment, the ink circulates between the ink jet head 3 and the undepicted ink tank.

Here, an undepicted pump is provided on the way in the channel between the ink supply ports 48 and the ink tank or on the way in the channel between the ink discharge ports 49 and the ink tank such that with that pump being driven, the ink flow occurs so as for the ink to circulate in the above-mentioned manner.

Further, the plate 37 is provided with damper chambers 51 which overlap with the supply manifolds 46 in the up/down direction and separate from the supply manifolds 46. Then, by deforming such partition walls separating the supply manifolds 46 and the damper chambers 51 as formed from a lower end portion of the plate 36, the ink inside the supply manifolds 46 is restrained from pressure variation. Further, the plate 37 is provided with damper chambers 52 which overlap with the feedback manifolds 47 in the up/down direction and separate from the feedback manifolds 47. Then, by deforming such partition walls separating the feedback manifolds 47 and the damper chambers 52 as formed from the lower end portion of the plate 36, the ink inside the feedback manifolds 47 is restrained from pressure variation.

<Piezoelectric Actuator>

As depicted in FIGS. 2 to 4, the piezoelectric actuator 22 has two piezoelectric layers 61 and 62, a common electrode 63, and a plurality of individual electrodes 64. The piezoelectric layers 61 and 62 are made of a piezoelectric material whose primary constituent is lead zirconate titanate (PZT) which is a mixed crystalline of lead zirconate and lead titanate. The piezoelectric layer 61 is arranged on the upper surface of the channel unit 21 while the piezoelectric layer 62 is arranged on the upper surface of the piezoelectric layer 61. Note that the piezoelectric layer 61 may be formed of a different material from the piezoelectric layer 62 such as an insulating material other than a piezoelectric material; for example, a synthetic resin material or the like.

The common electrode 63 is arranged between the piezoelectric layer 61 and the piezoelectric layer 62 to extend continuously throughout almost the entire area of the piezoelectric layers 61 and 62. The common electrode 63 is maintained at the ground potential. The plurality of individual electrodes 64 are provided individually for the plurality of pressure chambers 40. Each of the individual electrodes 64 has an approximately rectangular planar shape with the scanning direction as its longitudinal direction, and is arranged to overlap in the up/down direction with a central portion of the corresponding pressure chamber 40. Further, each of the individual electrodes 64 has such an end portion on the far side from the descender channel 42 along the scanning direction as extending to a position not overlapping with the pressure chamber 40 and its leading end being a connecting terminal **64*a* for connection with an undepicted wiring member. The connecting terminals 64*a* of the plurality of individual electrodes 64 are connected to an undepicted driver IC via the undepicted wiring member. Then, the driver IC selectively applies, individually to the plurality of individual electrodes 64, either the ground potential or a predetermined drive potential (for example, 20 V or so). Further, corresponding to such an arrangement of the common electrode 63 and the plurality of individual electrodes 64, such a part of the piezoelectric layer 62 as interposed between each individual electrode 64 and the common electrode 63** forms an active portion polarized in the thickness direction.

Hereinbelow, an explanation will be made about a method for driving the piezoelectric actuator 22 to jet the ink from the nozzles 45. With the piezoelectric actuator 22 in a standby state where the ink is not jetted from the nozzles 45, all the individual electrodes 64 are maintained at the ground potential as with the common electrode 63. For the ink to be jetted from a certain nozzle 45, the ground potential is switched to the drive potential in the two individual electrodes 64 corresponding to the two pressure chambers 40 connected to that nozzle 45.

Then, in the two active portions corresponding to the above two individual electrodes 64, such an electric field is generated as parallel to the polarization direction such that the above two active portions contract in a horizontal direction orthogonal to the polarization direction. By virtue of this, such parts of the piezoelectric layers 61 and 62 as overlapping in the up/down direction with the above two pressure chambers 40 are deformed as a whole to project toward the pressure chambers 40. As a result, the volumes of the pressure chambers 40 decrease such that the pressure on the ink in the pressure chambers 40 increases, so as to cause the ink to be jetted from the nozzle 45 in communication with the pressure chambers 40. Further, after the ink is jetted from the nozzle 45, the potential of the above two individual electrodes 64 is returned to the ground potential. With this, the piezoelectric layers 61 and 62 return to the state before being deformed.

<Discharge of Air Bubbles>

In the ink jet head 3 as explained above, air bubbles may flow from the nozzles 45 into the individual channels 30. If the flow-in air bubbles remain in the individual channels 30, then the ink may not be jetted normally from the nozzles 45 when the piezoelectric actuator 22 is driven as described above. Therefore, it is necessary to discharge the air bubbles having flowed into the individual channels 30 to the feedback manifolds 47 through, for example, the link channels 43, the descender channels 42, the pressure chambers 40, and the throttle channels 41.

On this occasion, in the first embodiment, the diameter D11 of the through holes **42*a* forming the descender channels 42 is smaller than the height H11 of the pressure chambers 40. Therefore, independent from the diameters of the air bubbles, the air bubbles do not stay in the connected parts between the pressure chambers 40 and the descender channels 42 but flow from the descender channels 42 to the pressure chambers 40**.

Figure 5A:
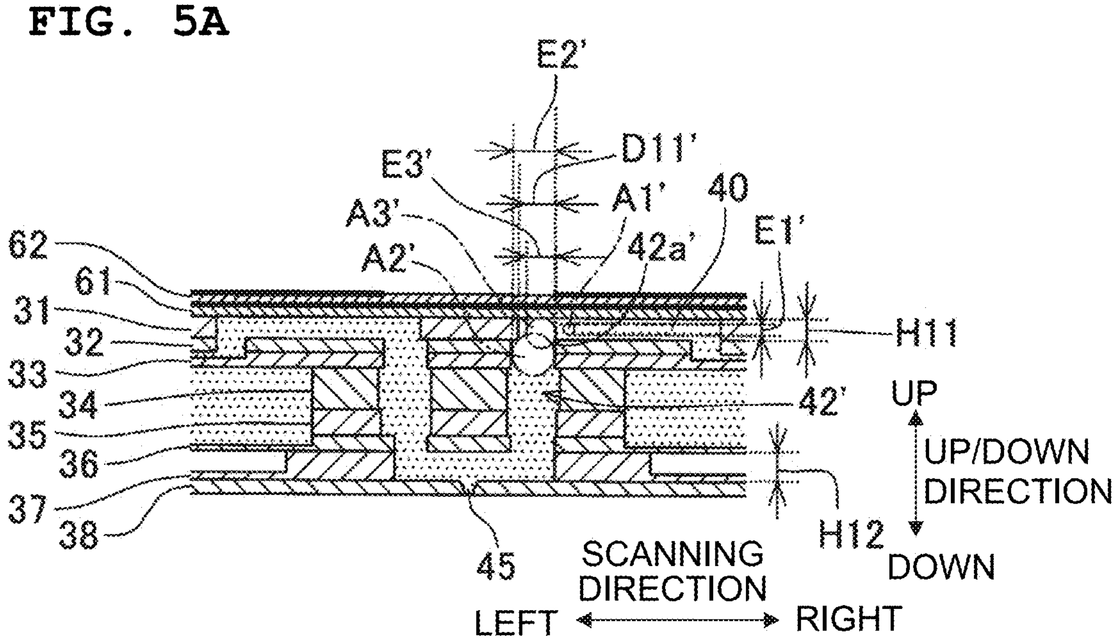
FIGS. 5A to 5D are diagrams for explaining an air bubble flow when the diameter of a through hole is larger than the height of a pressure chamber.
Figure 5B:
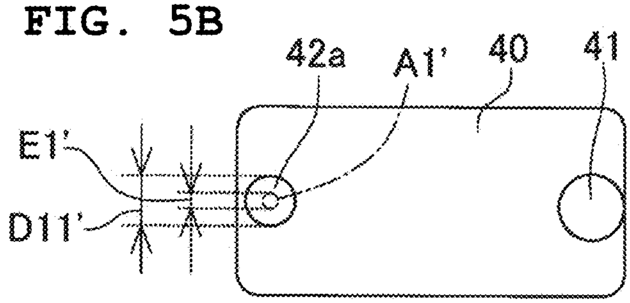

A more detailed explanation will be made about this aspect. As depicted in FIGS. 5A and 5B, consider a case where the diameter D11' of a through hole **42*a*' formed in the plate 32 to form a descender channel 42', which is different from the first embodiment, is not smaller than the height H11 of the pressure chamber 40. In this case, when an air bubble A1' has flowed in, whose diameter E1' is not larger than the height H11 of the pressure chamber 40, because the diameter E1' of the air bubble A1' is smaller than the diameter D11' of the through hole 42*a*', the air bubble A1' will not get stuck on the walls of the descender channel 42' and the pressure chamber 40 but flow from the descender channel 42' to the pressure chamber 40**.

Figure 5C:
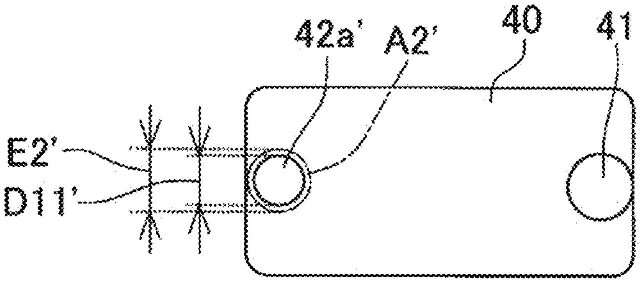

Further, as depicted in FIGS. 5A and 5C, when an air bubble A2' has flowed in, whose diameter E2' is not smaller than the diameter D11' of the through hole **42*a*', the air bubble A2' will get stuck in the through hole 42*a*'. Further, on this occasion, the air bubble A2' completely blocks the through hole 42*a*'. As described above, in the first embodiment, because the ink circulates between the ink jet head 3 and the undepicted ink tank, if the air bubble A2' completely blocks the through hole 42*a*', then a large pressure difference arises between the descender channel 42' and the pressure chamber 40 and, due to this pressure difference, the air bubble A2' is deformed and flows from the descender channel 42' to the pressure chamber 40**.

Figure 5D:
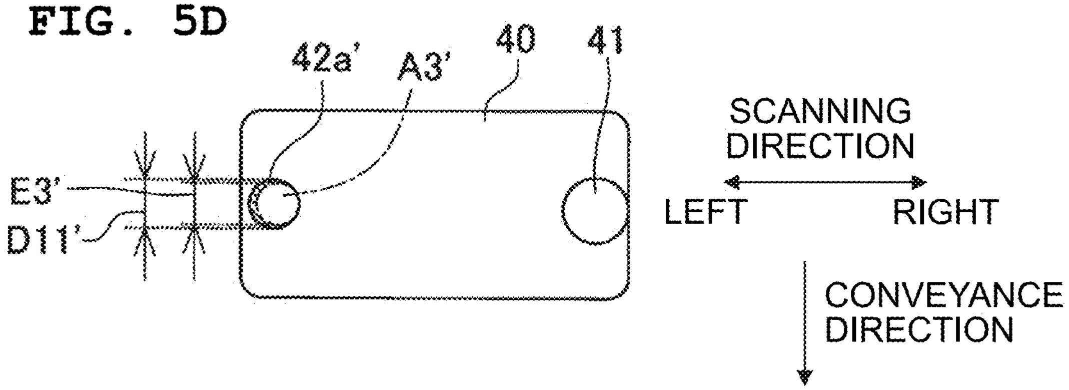

However, as depicted in FIGS. 5A and 5D, when an air bubble A3' has flowed in, whose diameter E3' is larger than the height H11 of the pressure chamber 40 but smaller than the diameter D11' of the descender channel 42', the air bubble A3' will come into the pressure chamber 40 from the descender channel 42' until contacting with the upper wall of the pressure chamber 40 (the piezoelectric layer 61), and get stuck in the pressure chamber 40 at that position. Further, in this state, the air bubble A3' only partly blocks the through hole **42*a*'. Hence, on this occasion, through such part of the through hole 42*a*' as not blocked by the air bubble A3' (the hatched part in FIG. 5D), the ink flows from the descender channel 42' to the pressure chamber 40. Therefore, no large pressure difference arises between the ink in the descender channel 42' and the ink in the pressure chamber 40, and thus the air bubble A3'** is liable to stay at that position.

Figure 6A:
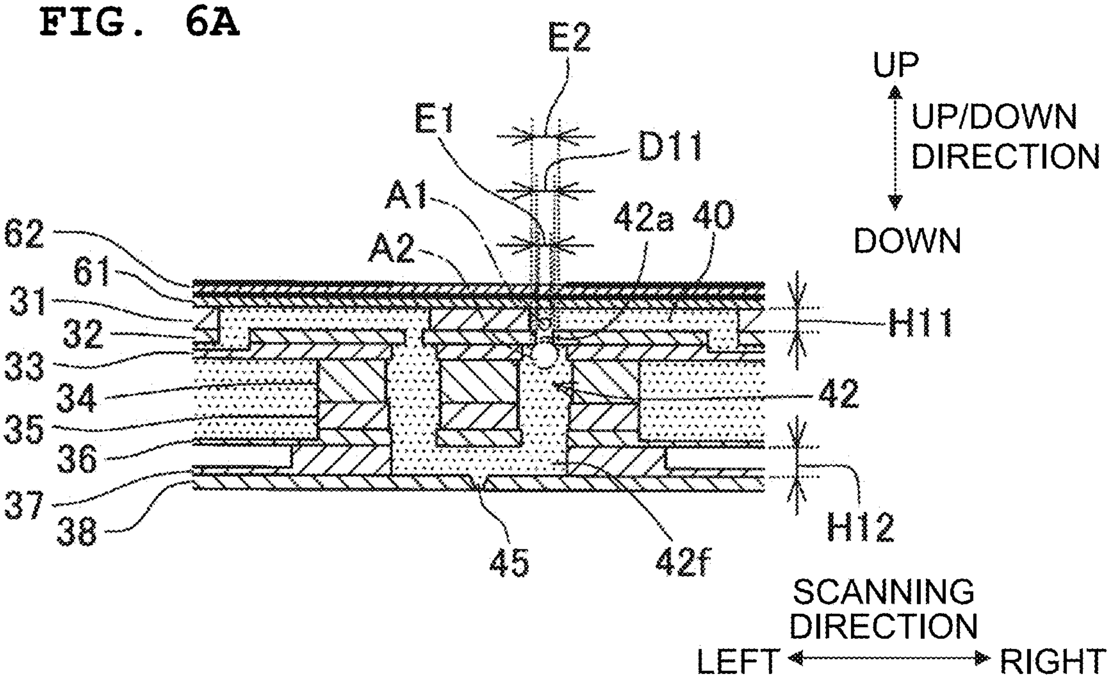
FIGS. 6A to 6C are diagrams for explaining the air bubble flow according to the first embodiment.
Figure 6B:
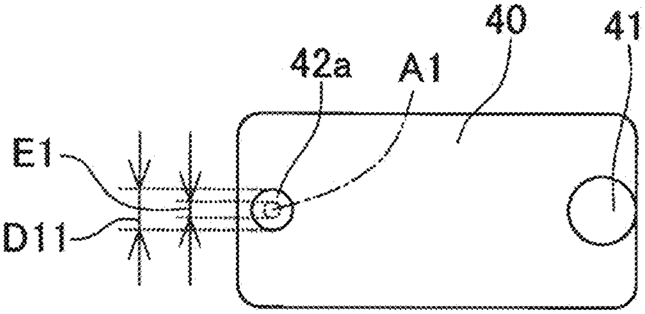
Figure 6C:
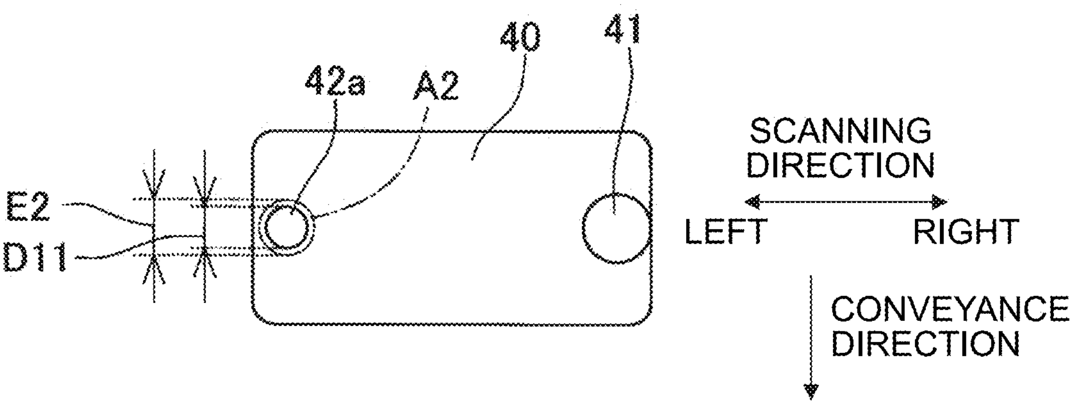

On the other hand, as in the first embodiment, if the diameter D11 of the through hole 42*a* is smaller than the height H11 of the pressure chamber 40, then as depicted in FIGS. 6A and 6B, when an air bubble A1 has flowed in, whose diameter E1 is not larger than the diameter D11 of the through hole 42*a*, because the diameter E1 of the air bubble A1 is smaller than height H11 of the pressure chamber 40, the air bubble A1 will not get stuck on the walls of the descender channel 42 and the pressure chamber 40 but flow from the descender channel 42 to the pressure chamber 40.

Further, when an air bubble A2 has flowed in, whose diameter E2 is not smaller than the diameter D11 of the through hole 42*a*, the air bubble A2 will get stuck in the through hole 42*a*. Further, on this occasion, the air bubble A2 completely blocks the through hole 42*a* as soon as arriving at the position below its contact with the upper wall of the pressure chamber 40. As described above, in the first embodiment, because the ink circulates between the ink jet head 3 and the undepicted ink tank, if the air bubble A2 completely blocks the through hole 42*a*, then a large pressure difference arises between the descender channel 42 and the pressure chamber 40 and, due to this pressure difference, the air bubble A2 is deformed and flows from the descender channel 42 to the pressure chamber 40.

Further, in the first embodiment, when the through hole 42*a* and the pressure chamber 40 are projected in the up/down direction, the through hole 42*a* stays within the range of the pressure chamber 40. In other words, when the through hole 42*a* and the pressure chamber 40 are projected in the up/down direction, the edge of the through hole 42*a* is positioned inside the edge of the pressure chamber 40. Therefore, when the air bubble flows from the descender channel 42 to the pressure chamber 40, the air bubble is less likely to get stuck in the boundary part between the through hole 42*a* and the pressure chamber 40, such that the air bubble flows smoothly there.

Further, in the first embodiment, such parts of the descender channel 42 as lower than the through hole 42*a* (the through holes 42*b* to 42*f*) have a larger diameter than the diameter D11 of the through hole 42*a*. By virtue of this, compared to the case where the entire descender channel 42 has the diameter D11, the descender channel 42 has a smaller channel resistance, such that it is possible to increase the ink jet quantity from the nozzles 45 when the piezoelectric actuator 22 is driven.

Further, in the first embodiment, the plate 32 is connected to the plate 31 formed with the pressure chamber 40. Then, the plate 32 is formed with the through hole 42*a* whose diameter D11 is smaller than the height H11 of the pressure chamber 40. Further, the through holes 42*b* to 42*f* are formed in the plate lower than the plate 32 to each have a larger diameter than the diameter D11 of the through hole 42*a*. By virtue of this, it is possible to form the descender channel 42 where the diameter D11 of the connected part with the pressure chamber 40 is smaller than the height H11 of the pressure chamber 40, while the parts lower than the connected part have larger diameters than the diameter D11.

Further, in the first embodiment, the height H12 of the link channel 43 is smaller than the diameter D12 of the through hole 42*f* (the part of the descender channel 42 connected to the link channel 43). By virtue of this, from the same reason as the aforementioned diameter D11 of the through hole 42*a* being smaller than the height H11 of the pressure chamber 40, independent from the diameters of the air bubbles, the air bubbles will not stay in the connected parts between the descender channels 42 and the link channels 43 but flow from the link channels 43 to the descender channels 42.

Further, in the first embodiment, when projected in the extending direction of the link channel 43, the link channel 43 stays within the range of the arranged through hole 42*f*. Therefore, when the air bubble flows from the link channel 43 to the descender channel 42, the air bubble is less likely to get stuck in the part of the link channel 43 connected to the descender channel 42.

Further, in the first embodiment, as depicted in FIG. 3, each of the throttle channels 41 extends linearly along the scanning direction. Therefore, each of the throttle channels 41 has, for example, a smaller channel resistance than in the case of being curved or bent, and it is possible to reduce the pump pressure for circulating the ink.

Further, in the first embodiment, as depicted in FIG. 4, the nozzle 45 is not arranged right below the descender channels 42. In other words, when projected in the up/down direction, the nozzles 45 are positioned outside any of the through holes 43*a* to 42*f*. Therefore, the air bubbles flowing in the descender channels 42 are less likely to get stuck in the nozzles 45.

Further, in the first embodiment, as depicted in FIGS. 2 and 3, all of the link channels 43 extend in one direction intersecting the scanning direction and the conveyance direction. Therefore, it is possible to lessen the number of pressure chambers not linked by the link channels 43, as compared to the case of the link channels 43 without a uniform extending direction.

Further, when viewed in the conveyance direction, the piezoelectric actuator 22 bends for the center to position somewhat lower in comparison to the outsides in the scanning direction. Due to this bending, between the outer nozzle rows 45A and 45F and the central nozzle rows 45C and 45D in the scanning direction, jetting characteristics are more or less different. In particular, the ink jetted from the nozzle rows 45C and 45D has a greater speed than the ink jetted from the nozzle rows 45A and 45F. Here, in the first embodiment as depicted in FIG. 2, the six nozzle rows 45A to 45F deviate downstream in position along the conveyance direction in the order from the leftmost nozzle row 45A. In particular, viewing the nozzle 45 of each nozzle row positioned the most upstream, in the order from the nozzle 45 belonging to the nozzle row 45A to the nozzle 45 belonging to the nozzle row 45F, the position in the conveyance direction deviates downstream. Further, with the nozzle 45 of each nozzle row positioned in the second from the upstream side, in the order from the nozzle 45 belonging to the nozzle row 45A to the nozzle 45 belonging to the nozzle row 45F, the position in the conveyance direction deviates downstream. That is, when viewed along the conveyance direction, an alternate arrangement is applied to the nozzles 45 with a low ink jet speed and the nozzles 45 with a high ink jet speed. Therefore, if the ink is jetted from each of the nozzles 45 onto the recording paper P to form a straight line extending in the conveyance direction, then it is possible to lessen the deviation in ink landing position and/or in variation in the size and density of the dots.

Second Embodiment

Next, a second preferred embodiment of the present teaching will be explained. The second embodiment is different from the first embodiment in the structure of the ink jet head.

As depicted in FIGS. 7 to 8A and 8B, an ink jet head 100 according to the second embodiment includes a channel unit 101 and a piezoelectric actuator 102.

<Channel Unit>

The channel unit 101 is formed by stacking eight plates 111 to 118 from above in the order of the plate numbers. The channel unit 101 is formed therein with a plurality of pressure chambers 120, a plurality of throttle channels 121, a plurality of descender channels 122, a plurality of circulation channels 123, a plurality of nozzles 125, six supply manifolds 126, and six feedback manifolds 127.

The plurality of pressure chambers 120 are formed in the plate 111 (the "first plate" of the present teaching). The pressure chambers 120 have the same shape as the pressure chambers 40 (see FIG. 2). Further, the plurality of pressure chambers 120 are arrayed in the conveyance direction to form pressure chamber rows 119. Further, six of the pressure chamber rows 119 are aligned in the scanning direction in the plate 111. Further, between the pressure chamber rows 119, the pressure chambers 120 deviate in position along the conveyance direction.

The plurality of throttle channels 121 are formed across the plates 112 and 113. The throttle channels 121 have the same shape as the throttle channels 41 (see FIG. 2), and each of the pressure chambers 120 is provided individually with a throttle channel 121. The throttle channels 121 are connected to the left ends of the pressure chambers 120 and extend leftward from the connected parts with the pressure chambers 120.

The plurality of descender channels 122 are formed of overlapping through holes 122*a* to 122*f* formed in the plates 112 to 117 in the up/down direction. Each of the pressure chambers 120 is provided individually with a descender channel 122. The descender channels 122 are connected to the right ends of the pressure chambers 120 and extend downward from the connected parts with the pressure chambers 120.

Further, among the through holes 122*a* to 122*f* forming the descender channels 122, the diameter D21 of the through hole 122*a* (an example of the "throttle" of the present teaching) formed in the plate 112 (the "second plate" of the present teaching) is smaller than the height H21 of the pressure chambers 120. On the other hand, the diameters of the through holes 122*b* to 122*f* formed in the plates 113 to 117 are larger than the diameter D21 of the through hole 122*a*. The diameter D21 of such part of the descender channels 122 as connected to the pressure chambers 120 is smaller than the height H21 of the pressure chambers 120, such that the diameters spread in the part positioned below the connected part with the pressure chambers 120 (the part at the far side from the pressure chambers 120). Further, when projected in the up/down direction, the edge of the through hole 122*a* is positioned inside of the edges of the pressure chambers 120. In other words, when projected in the up/down direction, the through hole 122*a* stays within the range of the arranged pressure chambers 120 and does not extend out from the pressure chamber 120.

The plurality of circulation channels 123 are formed in the plate 117. The circulation channels 123 are provided individually for the descender channels 122 and connected to the left lower end of the side wall of the the through hole 122*f* formed in the plate 117, among the through holes 122*a* to 122*f* forming the descender channels 122, and extend leftward from the connected parts with the descender channel 122 (the through hole 122*f*). Further, the height H22 of the circulation channel 123 is smaller than the diameter D22 of the through hole 122*f* (the part of the descender channels 122 connected to the circulation channel 123). Further, when the circulation channel 123 is projected in the extending and scanning direction, the circulation channel 123 stays within the range of the arranged descender channel 122 (the through hole 122*f*) and does not extend out from the descender channel 122. Further, in the second embodiment, the lower end (the lower edge) of the circulation channel 123 and the lower ends (the lower edges) of the descender channels 122 are all formed of the upper surface of the plate 118. That is, when the circulation channel 123 is projected in the extending and scanning direction, the lower edge of the circulation channel 123 overlaps with the lower edges of the descender channels 122.

The plurality of nozzles 125 are formed in the plate 118. Each of the descender channels 122 is provided individually for a nozzle 125 which is connected to the lower end of the descender channel 122.

Then, each individual channel 110 is formed from one nozzle 125, one descender channel 122 connected to that nozzle 125, one circulation channel 123 and one pressure chamber 120 connected to the descender channel 122, and the throttle channel 121 connected to the pressure chamber 120. Further, by arraying the plurality of individual channels 110 in the conveyance direction, individual channel rows 109 are formed. Further, in the channel unit 101, six individual channel rows 109 align in the scanning direction.

Six supply manifolds 126 are formed in the plate 117. The six supply manifolds 126 extend respectively in the conveyance direction to align in the scanning direction at intervals. The six supply manifolds 126 correspond to the six individual channel rows 109, and the respective supply manifolds 126 are connected to the circulation channels 123 of the plurality of individual channels 110 forming the corresponding individual channel rows 109. Further, the respective supply manifolds 126 extend inclined to the right along the scanning direction in the upstream part from the individual channel rows 109 along the conveyance direction. Each of the supply manifolds 126 is provided with an ink supply port 128 in an upstream end portion along the conveyance direction. Then, the ink retained in the undepicted ink tank is supplied to the supply manifolds 126 from the ink supply ports 128. By virtue of this, in the supply manifolds 126, the ink flows from upstream to downstream along the conveyance direction to supply the individual channels 110 (the circulation channels 123).

The six feedback manifolds 127 are formed in plate 114. The six feedback manifolds 127 extend respectively in the conveyance direction to align in the scanning direction at intervals. The feedback manifolds 127 are positioned above the supply manifolds 126 and overlap with the supply manifolds 126 in the up/down direction. Further, the six feedback manifolds 127 correspond to the six individual channel rows 109, and the respective feedback manifolds 127 are connected to the throttle channels 121 of the plurality of individual channels 110 forming the corresponding individual channel rows 109. Further, the respective feedback manifolds 127 extend inclined to the left along the scanning direction in the upstream part from the individual channel rows 109 along the conveyance direction. Further, each of the feedback manifolds 127 is provided with an ink supply port 129 in an upstream end portion along the conveyance direction. The ink supply ports 129 are connected to the undepicted ink tank. Then, from the individual channels 110 (the throttle channels 121), the ink flows into the feedback manifolds 127, flows on from downstream to upstream along the conveyance direction, and flows out of the ink discharge ports 129. The ink having flowed out of the ink discharge ports 129 is fed back to the undepicted ink tank. That is, in the second embodiment, the ink circulates between the ink jet head 100 and the undepicted ink tank.

Here, an undepicted pump is provided on the way in the channel between the ink supply port 128 and the ink tank or on the way in the channel between the ink supply port 129 and the ink tank, such that with that pump being driven, the ink flow occurs so that the ink circulates as described earlier on.

Further, the plate 101 is provided with damper chambers 130 which extend over from a lower portion of the plate 115 to an upper portion of the plate 116 to and overlap with the supply manifolds 126 and the feedback manifolds 127 in the up/down direction. Then, by deforming such partition walls separating the supply manifolds 126 and the damper chambers 130 as formed from a lower end portion of the plate 116, the ink inside the supply manifolds 126 is restrained from pressure variation. Further, by deforming such partition walls separating the feedback manifolds 127 and the damper chambers 130 as formed from an upper end portion of the plate 115, the ink inside the feedback manifolds 127 is restrained from pressure variation.

<Piezoelectric Actuator>

The piezoelectric actuator 102 has two piezoelectric layers 141 and 142, a common electrode 143, and a plurality of individual electrodes 144. The piezoelectric layers 141 and 142 are made of a piezoelectric material. The piezoelectric layer 141 is arranged on the upper surface of the channel unit 101 while the piezoelectric layer 142 is arranged on the upper surface of the piezoelectric layer 141. Note that as with the piezoelectric layer 61, the piezoelectric layer 141 may be formed of an insulating material other than a piezoelectric material.

The common electrode 143 is arranged between the piezoelectric layer 141 and the piezoelectric layer 142 to extend continuously throughout almost the entire area of the piezoelectric layers 141 and 142. The common electrode 143 is maintained at the ground potential. The plurality of individual electrodes 144 are provided individually for the plurality of pressure chambers 120. As with the individual electrodes 64, each of the individual electrodes 144 has an approximately rectangular planar shape, and is arranged to overlap in the up/down direction with a central portion of the corresponding pressure chamber 120. Further, each of the plurality of individual electrodes 144 has a connecting terminal 144*a* which is connected to an undepicted driver IC via an undepicted wiring member. Then, the driver IC selectively applies, individually to the plurality of individual electrodes 144, either the ground potential or the drive potential. Further, corresponding to such an arrangement of the common electrode 143 and the plurality of individual electrodes 144, such a part of the piezoelectric layer 142 as interposed between each individual electrode 144 and the common electrode 143 forms an active portion polarized in the thickness direction.

Hereinbelow, an explanation will be made about a method for driving the piezoelectric actuator 102 to jet the ink from the nozzles 125. With the piezoelectric actuator 102 in a standby state where the ink is not jetted from the nozzles 125, all the individual electrodes 144 are maintained at the ground potential as with the common electrode 143. For the ink to be jetted from a certain nozzle 125, the ground potential is switched to the drive potential in the individual electrodes 144 corresponding to that nozzle 125.

Then, in the same manner as in the first embodiment, such parts of the piezoelectric layers 141 and 142 as overlapping in the up/down direction with the pressure chambers 120 are deformed as a whole to project toward the pressure chambers 120. As a result, the volumes of the pressure chambers 120 decrease such that the pressure on the ink in the pressure chambers 120 increases, so as to cause the ink to be jetted from the nozzles 125 in communication with the pressure chambers 120. Further, after the ink is jetted from the nozzles 125, the potential of the individual electrodes 144 is returned to the ground potential.

In the ink jet head 100 as explained above, air bubbles may flow from the nozzles 125 into the individual channels 110. If the flow-in air bubbles remain in the individual channels 110, then the ink may not be jetted normally from the nozzles 125 when the piezoelectric actuator 102 is driven. Therefore, it is necessary to discharge the air bubbles having flowed into the individual channels 110 to the feedback manifolds 127 through the descender channels 122, the pressure chambers 120, and the throttle channels 121.

On this occasion, in the second embodiment, the diameter D21 of the through holes 122*a* forming the descender channels 122 is smaller than the height H21 of the pressure chambers 120. Therefore, in the same manner as in the first embodiment, independent from the diameters of the air bubbles, the air bubbles will not stay in the connected parts between the pressure chambers 120 and the descender channels 122 but flow from the descender channels 122 to the pressure chambers 120.

Further, in the second embodiment, when projected in the up/down direction, the through hole 122*a* stays within the range of the pressure chamber 120. Therefore, when the air bubble flows from the descender channel 122 to the pressure chamber 120, the air bubble is less likely to get stuck in the boundary part between the through hole 122*a* and the pressure chamber 120, such that the air bubble flows smoothly there. Further, in the second embodiment, when projected in the up/down direction, the edge of the through hole 122*a* is positioned at the inside of the edge of the pressure chamber 120. By virtue of this, the air bubble flows more easily from the descender channel 122 to the pressure chamber 120.

Further, in the second embodiment, such parts of the descender channel 122 as lower than the through hole 122*a* (the through holes 122*b* to 122*f*) to form the connected parts with the pressure chambers 120 have a larger diameter than the diameter D21 of the through hole 122*a*. By virtue of this, compared to the case where the entire descender channel 122 has the diameter D21, the descender channel 122 has a smaller channel resistance, such that it is possible to increase the ink jet quantity from the nozzles 125 when the piezoelectric actuator 102 is driven.

Further, in the second embodiment, the plate 112 is connected to the plate 111 formed with the pressure chambers 120. The through hole 122*a* is formed in the plate 112, and the diameter D21 of the through hole 122*a* is smaller than the height H21 of the pressure chamber 120. Further, the through holes 122*b* to 122*f* are formed in the plates 113 to 117 lower than the plate 112. Each of the through holes 122*b* to 122*f* has a larger diameter than the diameter D21 of the through hole 122*a*. By virtue of this, it is possible to form the descender channel 122 where the diameter D21 of the connected part with the pressure chamber 120 is smaller than the height H21 of the pressure chamber 120, while the parts lower than the connected part have larger diameters than the diameter D21.

Further, in the second embodiment, the height H22 of the circulation channel 123 is smaller than the diameter D22 of the through hole 122*f* (the part of the descender channel 122 connected to the circulation channel 123). By virtue of this, from the same reason as the aforementioned diameter D21 of the through hole 122*a* being smaller than the height H21 of the pressure chamber 120, independent from the diameters of the air bubbles, the air bubbles will not stay in the connected parts between the descender channels 122 and the circulation channels 123 but flow from the circulation channels 123 to the descender channels 122. Note that the air bubbles having flowed into the descender channels 122 from the nozzles 125 may flow into the circulation channels 123 from the descender channels 122. In such a case, too, it is easier for the air bubbles having flowed into the circulation channels 123 to return to the descender channels 122.

Further, in the second embodiment, when the circulation channel 123 is projected in the extending and scanning direction, the circulation channel 123 stays within the range of the arranged through hole 122*f*. Therefore, even if the air bubble flows from the descender channel 122 to the circulation channel 123, the air bubble is less likely to get stuck in the part of the circulation channel 123 connected to the descender channel 122 and thus to return to the descender channel 122 easily.

Further, in the second embodiment, the damper chambers 130, which are thick in the up/down direction, are formed across the two plates 115 and 116. Therefore, it is possible to effectively absorb the pressure variation of the ink inside the supply manifolds 126 and the pressure variation of the ink inside the feedback manifolds 127.

Figure 7:
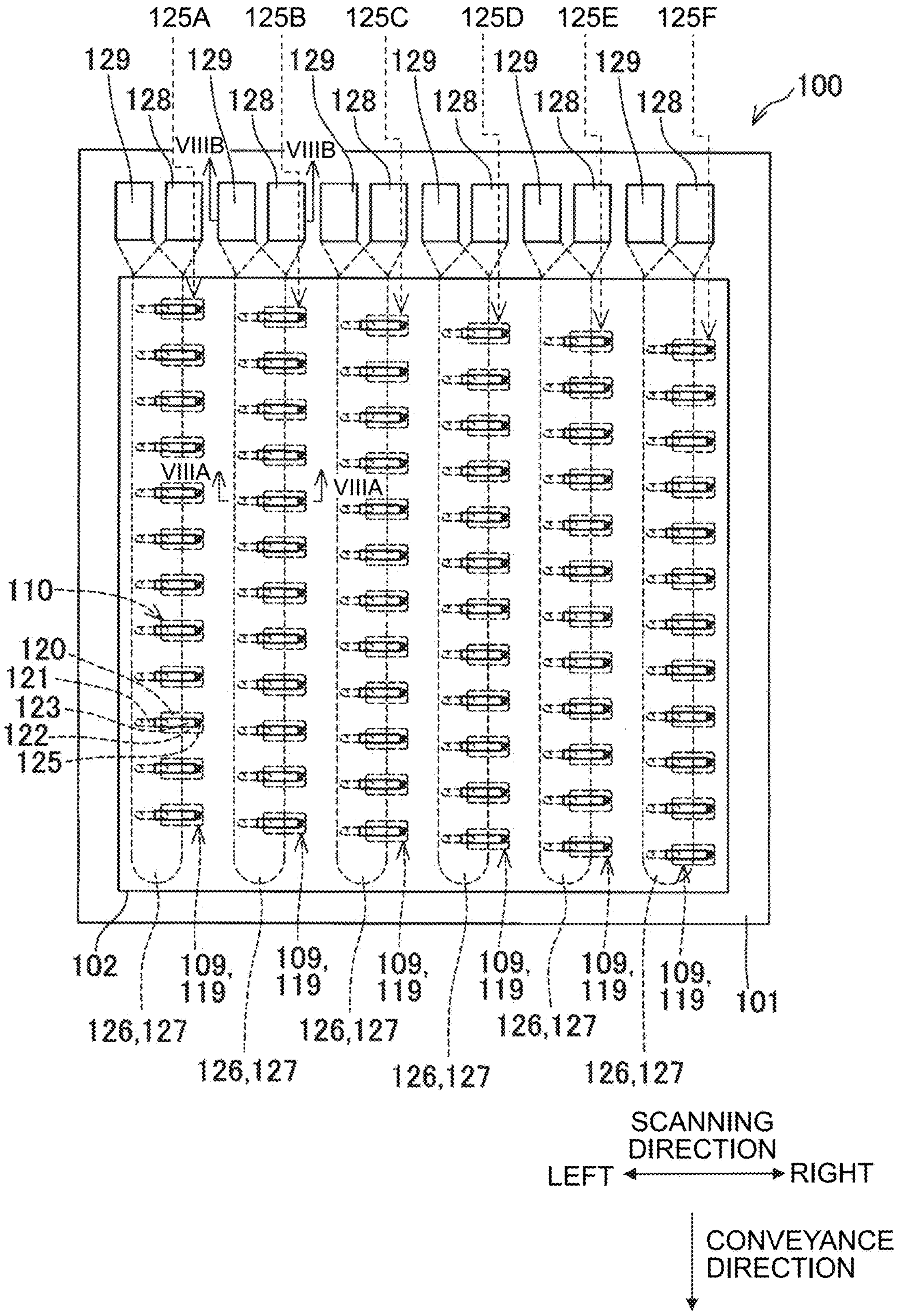
FIG. 7 is a plan view of an ink jet head according to a second embodiment.
Figure 8A:
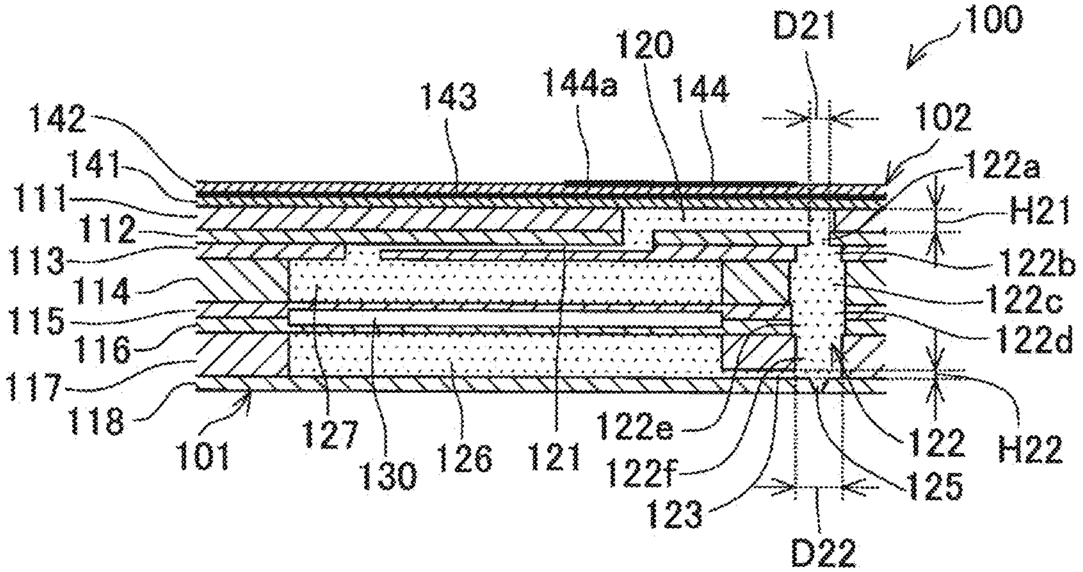
FIG. 8A is a cross-sectional view along the line VIIIA-VIIIA of FIG. 7.
Figure 8B:
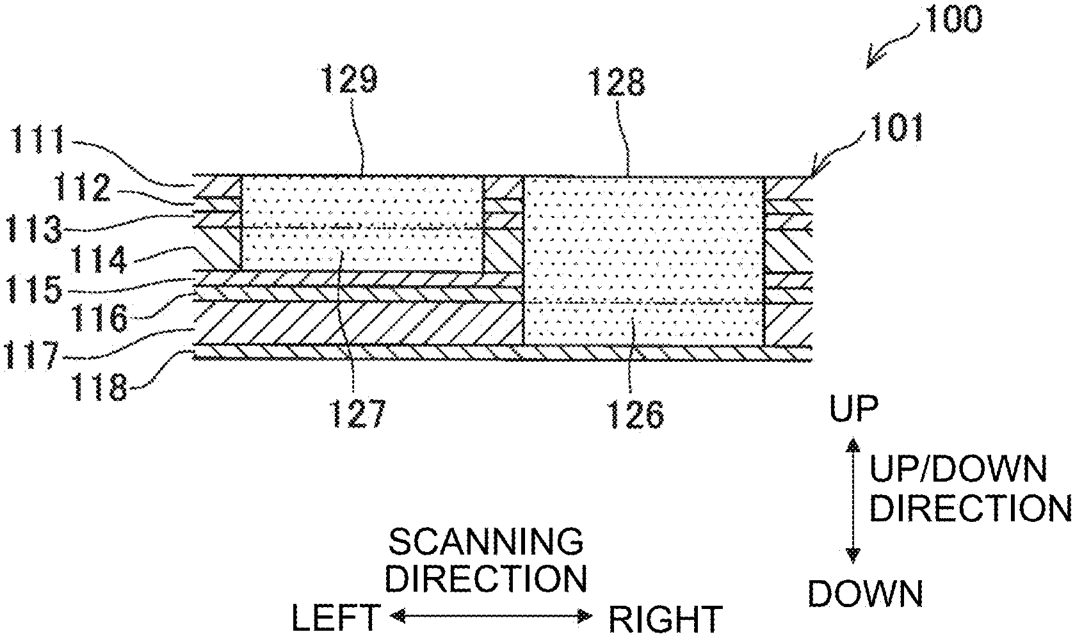
FIG. 8B is a cross-sectional view along the line VIIIB-VIIIB of FIG. 7.

In the second embodiment, as depicted in FIG. 7, each of the throttle channels 121 extends linearly along the scanning direction. Therefore, each of the throttle channels 121 has, for example, a smaller channel resistance than in the case of being curved or bent, and it is possible to reduce the pump pressure for circulating the ink.

Further, when viewed in the conveyance direction, the piezoelectric actuator 102 bends for the center to position somewhat lower in comparison to the outsides in the scanning direction. Due to this bending, between the outer nozzle rows 125A and 125F and the central nozzle rows 125C and 125D in the scanning direction, jetting characteristics are more or less different. In particular, the ink jetted from the nozzle rows 125C and 125D has a greater speed than the ink jetted from the nozzle rows 125A and 125F. Here, in the second embodiment as depicted in FIG. 7, the six nozzle rows 125A to 125F deviate downstream in position along the conveyance direction in the order from the leftmost nozzle row 125A. In particular, viewing the nozzle 125 of each nozzle row positioned the most upstream, in the order from the nozzle 125 belonging to the nozzle row 125A to the nozzle 125 belonging to the nozzle row 125F, the position in the conveyance direction deviates downstream. Further, with the nozzle 125 of each nozzle row positioned in the second from the upstream side, in the order from the nozzle 125 belonging to the nozzle row 125A to the nozzle 125 belonging to the nozzle row 125F, the position in the conveyance direction deviates downstream. That is, when viewed along the conveyance direction, an alternate arrangement is applied to the nozzles 125 with a low ink jet speed and the nozzles 125 with a high ink jet speed. Therefore, if the ink is jetted from each of the nozzles 125 onto the recording paper P to form a straight line extending in the conveyance direction, then it is possible to lessen the deviation in ink landing position and/or in variation in the size and density of the dots.

Hereinabove, the preferred embodiments of the present teaching were explained. However, the present teaching is not limited to the above explanation but it is possible to apply various changes and modifications thereto without departing from the scope set forth in the appended claims.

The present teaching is not limited to forming, as in the first and second embodiments, the descender channels where the diameter of the connected part with the pressure chambers is smaller than the height of the pressure chambers whereas the diameter of the part below the connected part with the pressure chambers is larger than the height of the pressure chambers.

Figure 9:
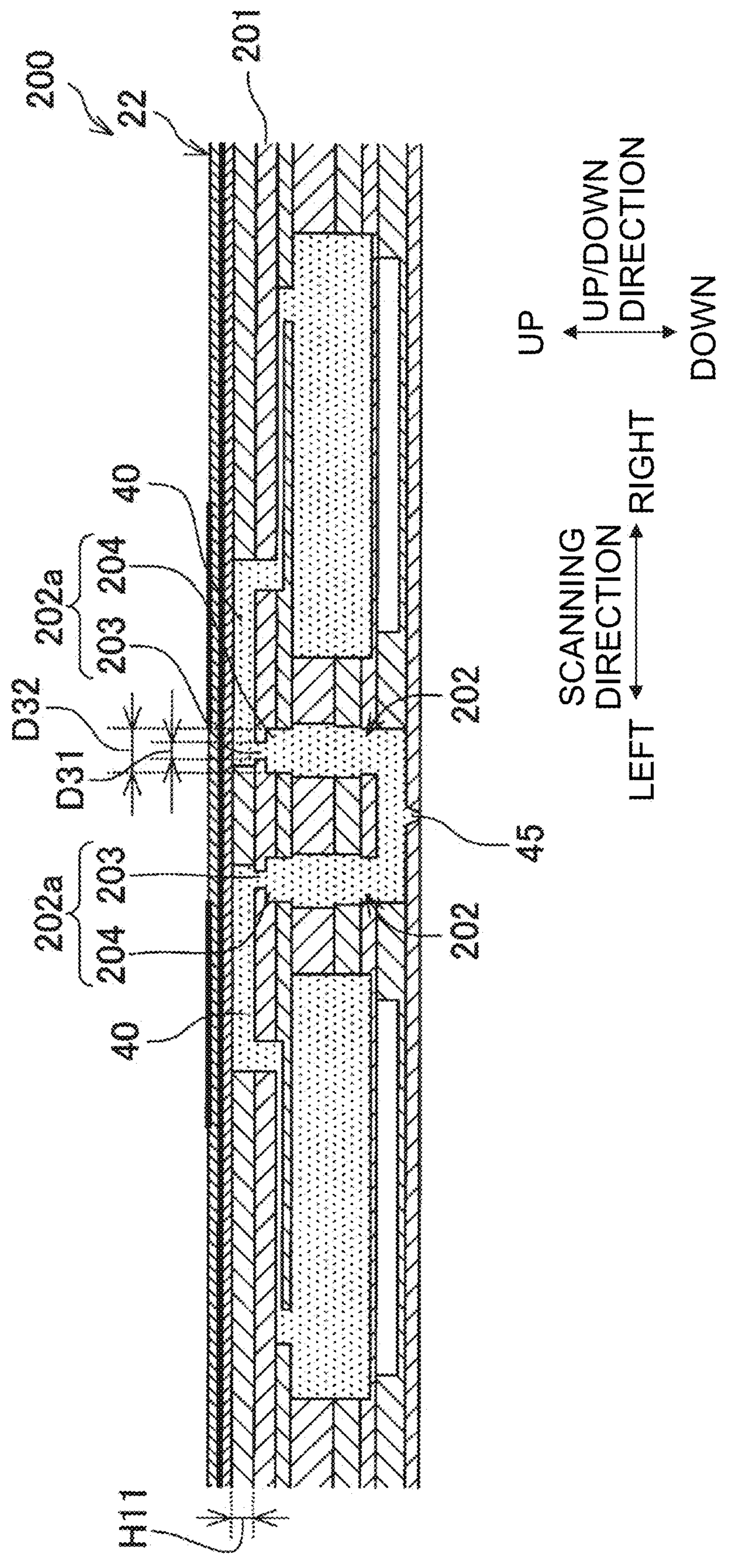
FIG. 9 is a cross-sectional view along a scanning direction, of an ink jet head according to a first modified embodiment.

As depicted in FIG. 9, an ink jet head 200 according to a first modified embodiment has replaced the plate 32 of the ink jet head 3 (see FIG. 4) of the first embodiment for a plate 201 (the "second plate" of the present teaching). In the plate 201, instead of the plate 32, through holes 202*a* are formed instead of the through holes 42*a* to form descender channels 202. The diameter D31 of first orificial portions 203 being approximately the upper halves of the through holes 202*a* is smaller than the height H11 of the pressure chambers 40. On the other hand, the diameter D32 of second orificial portions 204 being approximately the lower halves of the through holes 202*a* is larger than the height H11 of the pressure chambers 40. Here, it is possible to form the through holes 202*a* by half-etching the plate 201 from both sides respectively.

Then, in case of the first modified embodiment, it is also possible to make the diameter D31 of the part the descender channels 202 connected to the pressure chambers 40 be smaller than the height H11 of the pressure chambers 40, and make the diameter of the part of the descender channels 202 below the part connected to the pressure chambers 40 be larger than the diameter D31 of the part connected to the pressure chambers 40. Further, in this case, compared to a case where the entire through hole formed in the plate 201 has the diameter D31, the descender channel 202 has a smaller channel resistance, such that it is possible to increase the ink jet quantity from the nozzles 45 when the piezoelectric actuator 22 is driven to apply the pressure to the ink in the pressure chambers 40. Further, much the same is true as in the first modified embodiment on the descender channels of the ink jet head 100 of the second embodiment.

Figure 10:
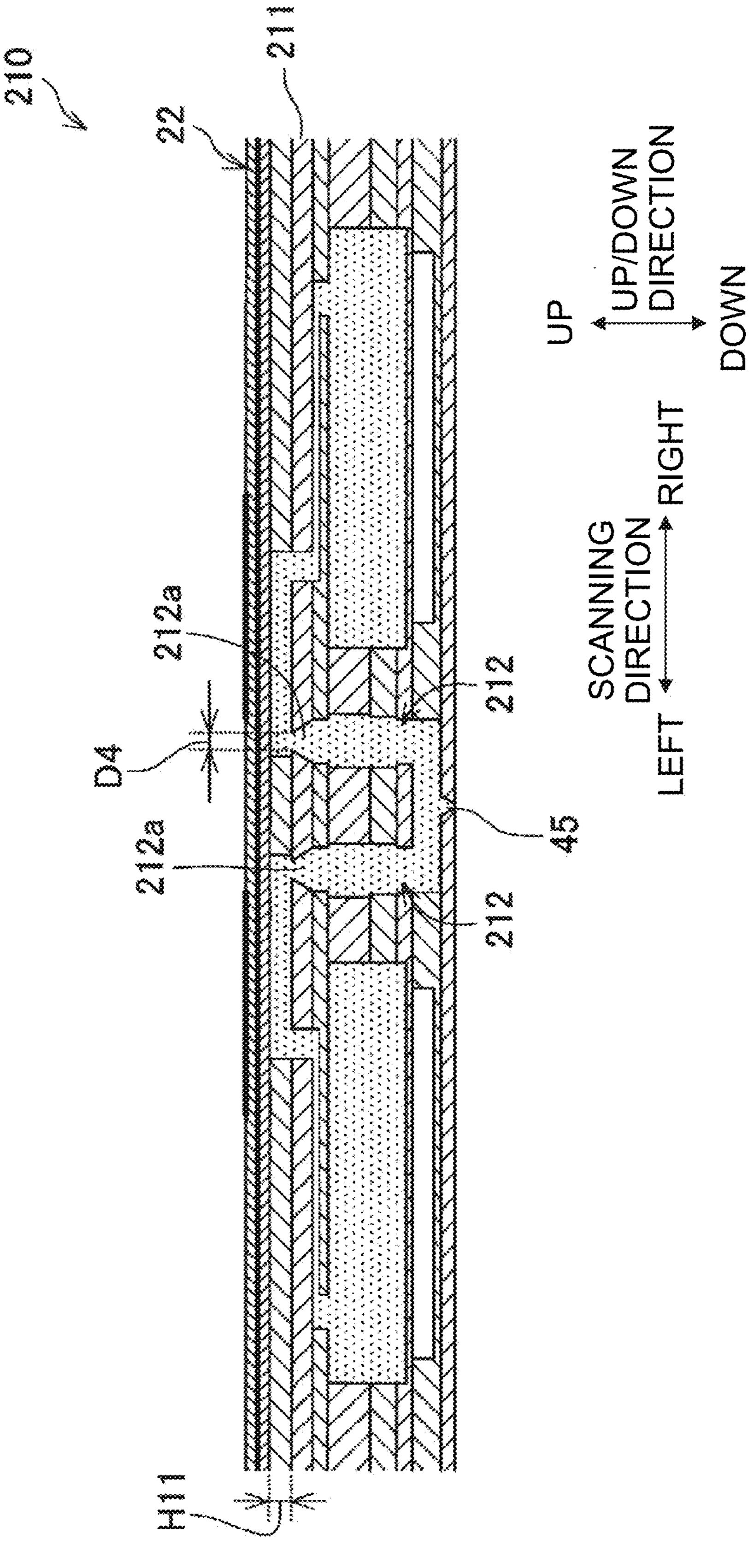
FIG. 10 is a cross-sectional view along the scanning direction, of an ink jet head according to a second modified embodiment.
Figure 11:
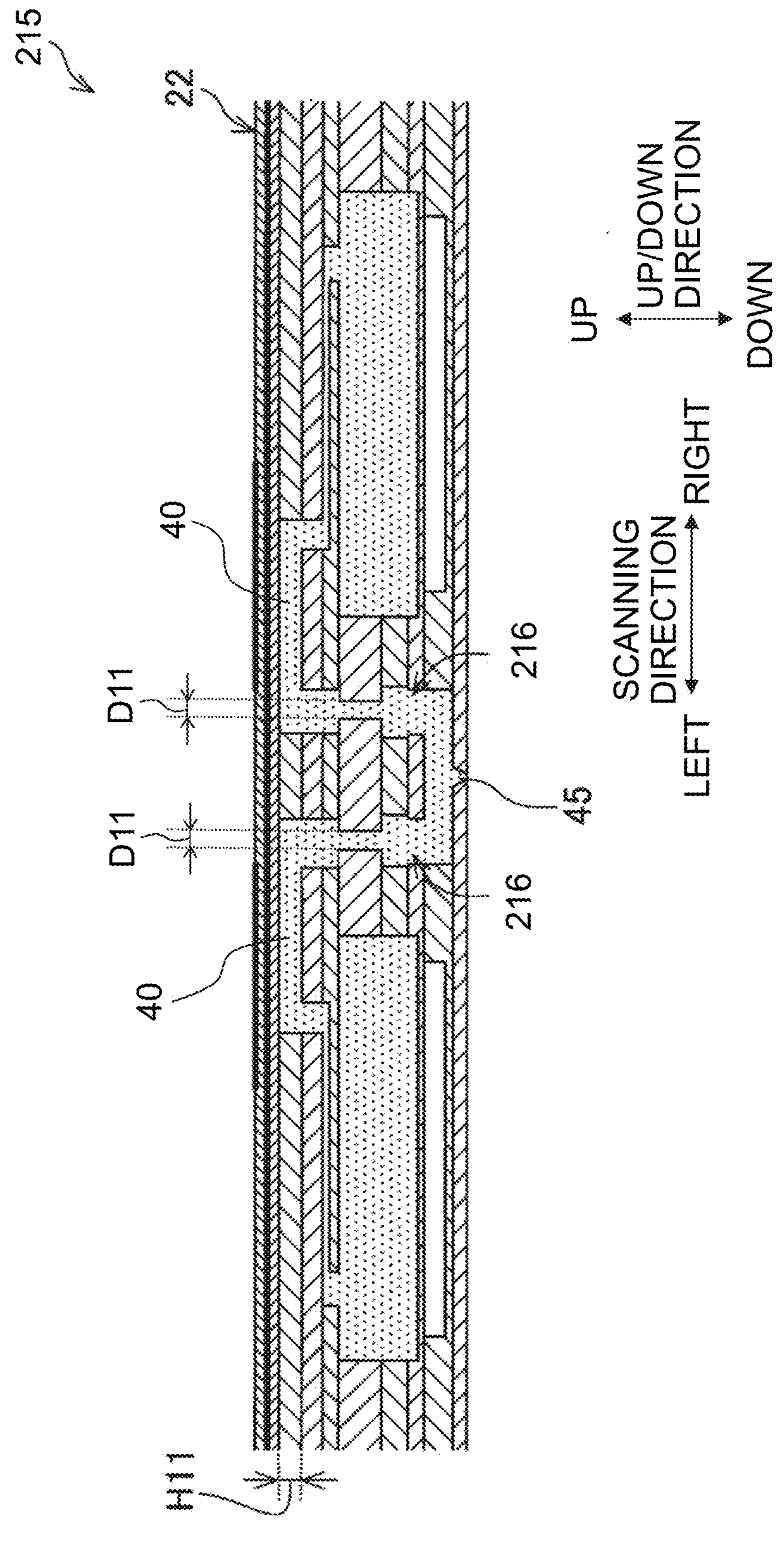
FIG. 11 is a cross-sectional view along the scanning direction, of an ink jet head according to a third modified embodiment.

As depicted in FIG. 10, an ink jet head 210 according to a second modified embodiment has replaced the plate 32 of the ink jet head 3 (see FIG. 4) of the first embodiment for a plate 211. In the plate 211, instead of the plate 32, through holes 212*a* are formed instead of the through holes 42*a* to form descender channels 212. The diameter D4 of upper ends of the through holes 212*a* is smaller than the height H11 of the pressure chambers 40, while the more downward (the farther away from the pressure chambers 40), the larger the diameter of the through holes 212*a* so as to have a tapered shape.

Then, in case of the second modified embodiment, it is also possible to make the diameter D4 of the part the descender channels 212 connected to the pressure chambers 40 be smaller than the height H11 of the pressure chambers 40, and make the diameter of the part of the descender channels 212 below the part connected to the pressure chambers 40 be larger than the diameter D4 of the part connected to the pressure chambers 40. Further, in this case, compared to a case where the entire through hole formed in the plate 211 has the diameter D4, the descender channel 212 has a smaller channel resistance, such that it is possible to increase the ink jet quantity from the nozzles 45 when the piezoelectric actuator 22 is driven to apply the pressure to the ink in the pressure chambers 40. Further, much the same is true as in the second modified embodiment on the descender channels of the ink jet head 100 of the second embodiment.

In the first and second embodiments and in the first and second modified embodiments, with the descender channels, the diameter of the connected part with the pressure chambers is smaller than the height of the pressure chambers whereas the diameter of the entire part below the connected part with the pressure chambers is larger than the height of the pressure chambers. However, without being limited to that, for example, at least part of the descender channels 216 (an example of the "throttle" of the present teaching) below the connected parts to the pressure chambers 40 may have a smaller diameter D11 than the height H11 of the pressure chambers 40 (a third modified embodiment). Further, the diameter of the entire descender channels 216 may be smaller than the height H11 of the pressure chambers 40.

Further, in the first embodiment, when projected in the up/down direction, the edge of the descender channel 42 (the through hole 42*a*) is positioned inside of the edges of the pressure chambers 40. However, without being limited to that, for example, in the first embodiment, when projected in the up/down direction, the right edges of the descender channels 42 may overlap with the right edges of the pressure chambers 40. In this case, too, compared to the case where the descender channels 42 extend out from the pressure chambers 40, the air bubbles are less likely to get stuck between the descender channels 42 and the pressure chambers 40. In the same manner, in the second embodiment, when projected in the up/down direction, the right edges of the descender channels 122 may overlap with the right edges of the pressure chambers 120.

Further, in the first embodiment, when projected in the up/down direction, the through holes 42*a*, which are the connected part of the descender channels 42 with the pressure chambers 40, stay within the range of the arranged pressure chambers 40. However, the present teaching is not limited to that.

Figure 12:
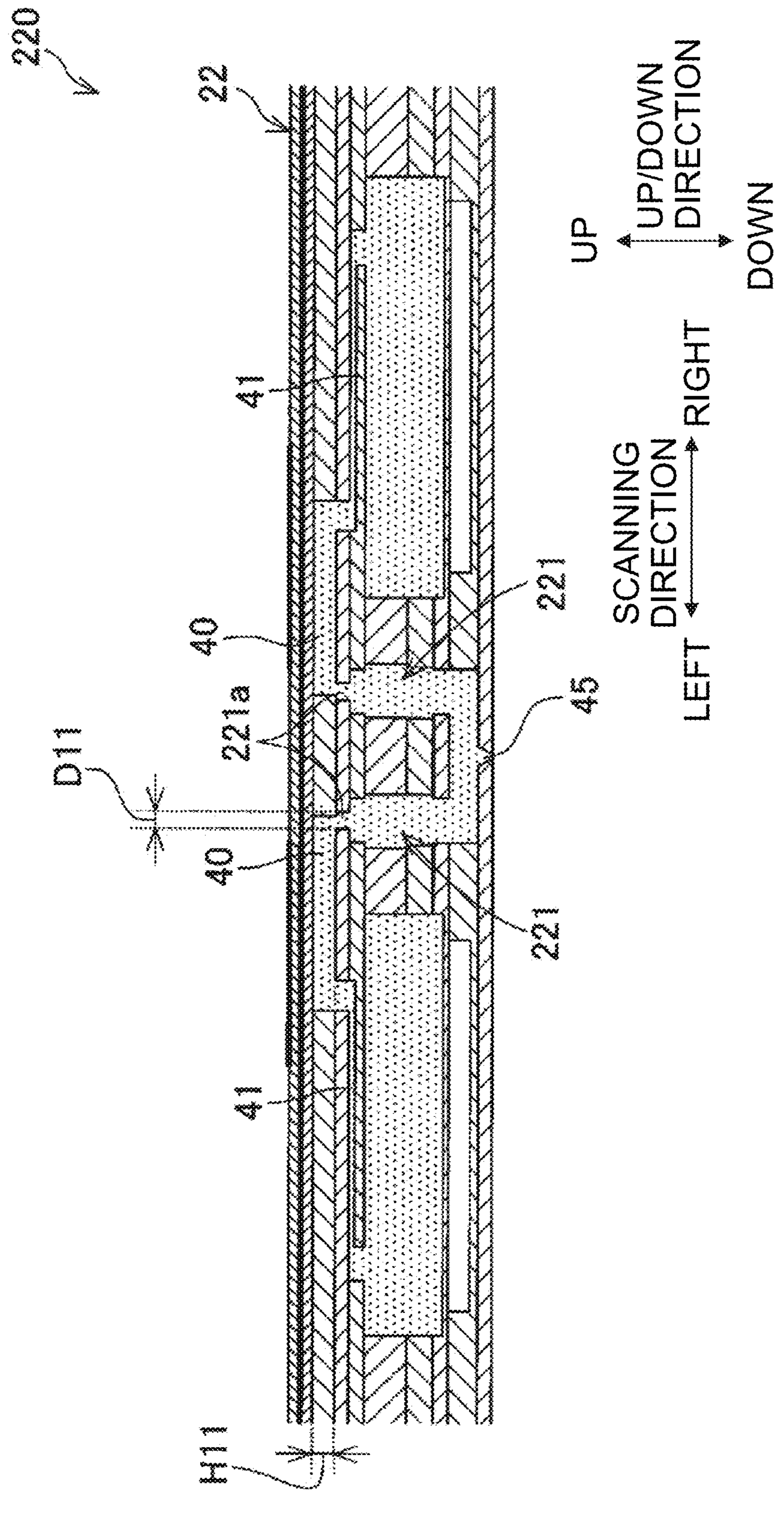
FIG. 12 is a cross-sectional view along the scanning direction, of an ink jet head according to a fourth modified embodiment.

As depicted in FIG. 12, an ink jet head 220 according to the third modified embodiment has replaced the descender channel 42 for a descender channel 221 in the ink jet head 3 (see FIG. 4). The descender channel 221 is arranged at a position deviating from the position where the descender channel 42 is arranged to the far side from the throttle channel 41 along the scanning direction. By virtue of this, in the ink jet head 220, when projected in the up/down direction, the through hole 221*a* extends out of the range where the pressure chamber 40 is arranged along the scanning direction.

In the case of a fourth modified embodiment, the air bubbles in the descender channels 221 are more likely to get stuck in the extend-out part of the through holes 221*a* from the pressure chambers 40 along the scanning direction. However, in the fourth modified embodiment, too, because the diameter D11 of the through holes 221*a* is smaller than the height H11 of the pressure chambers 40, the stuck air bubbles will not stay continuously but flow from the descender channels 221 to the pressure chambers 40. Further, the descender channels of the ink jet head 100 in the second embodiment may be configured in the same manner as in the fourth modified embodiment.

Further, in the first embodiment, the height H12 of the link channel 43 is smaller than the diameter D12 of the through hole 42*f*. However, without being limited to that, in the first embodiment, the height H12 of the link channel 43 may be not smaller than the diameter D12 of the through hole 42*f*. Likewise, in the second embodiment, the height H22 of the circulation channel 123 may be not smaller than the diameter D22 of the through hole 122*f*.

Further, in the above examples, while the descender channels extend almost parallel to the up/down direction, the present teaching is not limited to that.

Figure 13:
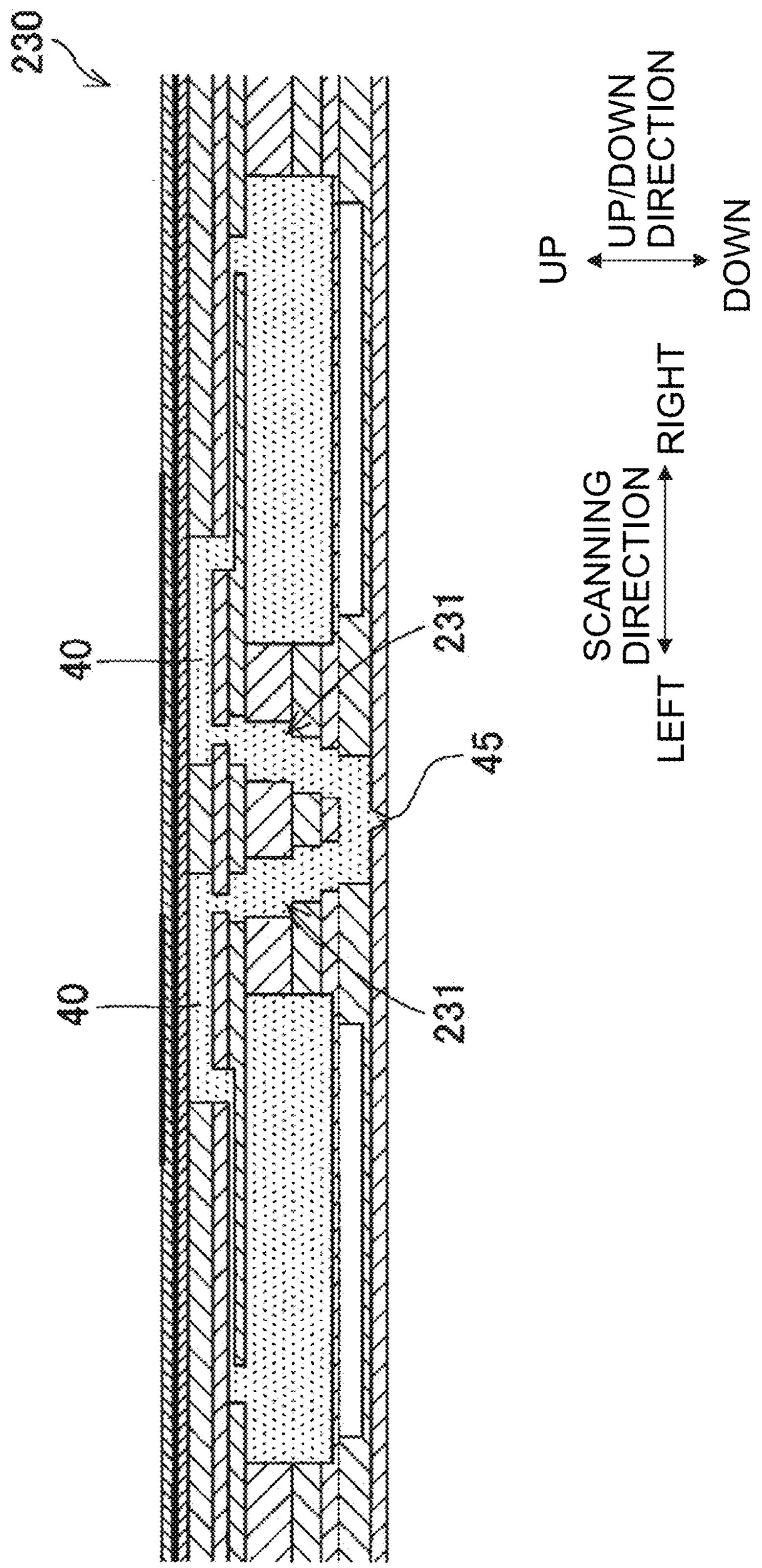
FIG. 13 is a cross-sectional view along the scanning direction, of an ink jet head according to a fifth modified embodiment.

As depicted in FIG. 13, in an ink jet head 230 according to a fifth modified embodiment, descender channels 231 extend in an inclined direction with respect to the up/down direction such that the more from the upper side toward the lower side, the closer to the nozzles 45 along the scanning direction. For example, by letting the centers of the through holes forming the descender channels 231 deviate in the scanning direction, it is possible to form the descender channels 231 extending inclined with respect to the up/down direction in the above manner. Then, in this case, with the descender channels 231 extending inclined with respect to the up/down direction, the air bubbles flow readily from the descender channels 231 to the pressure chambers 40.

Further, in the first embodiment, by positioning the lower ends (the lower edges) of the descender channels 42 and the lower end (the lower edge) of the link channel 43 to the same height, when the link channel 43 is projected along the extending direction, the lower edges of the descender channels 42 overlap with the lower edge of the link channel 43. However, the present teaching is not limited to that.

Figure 14:
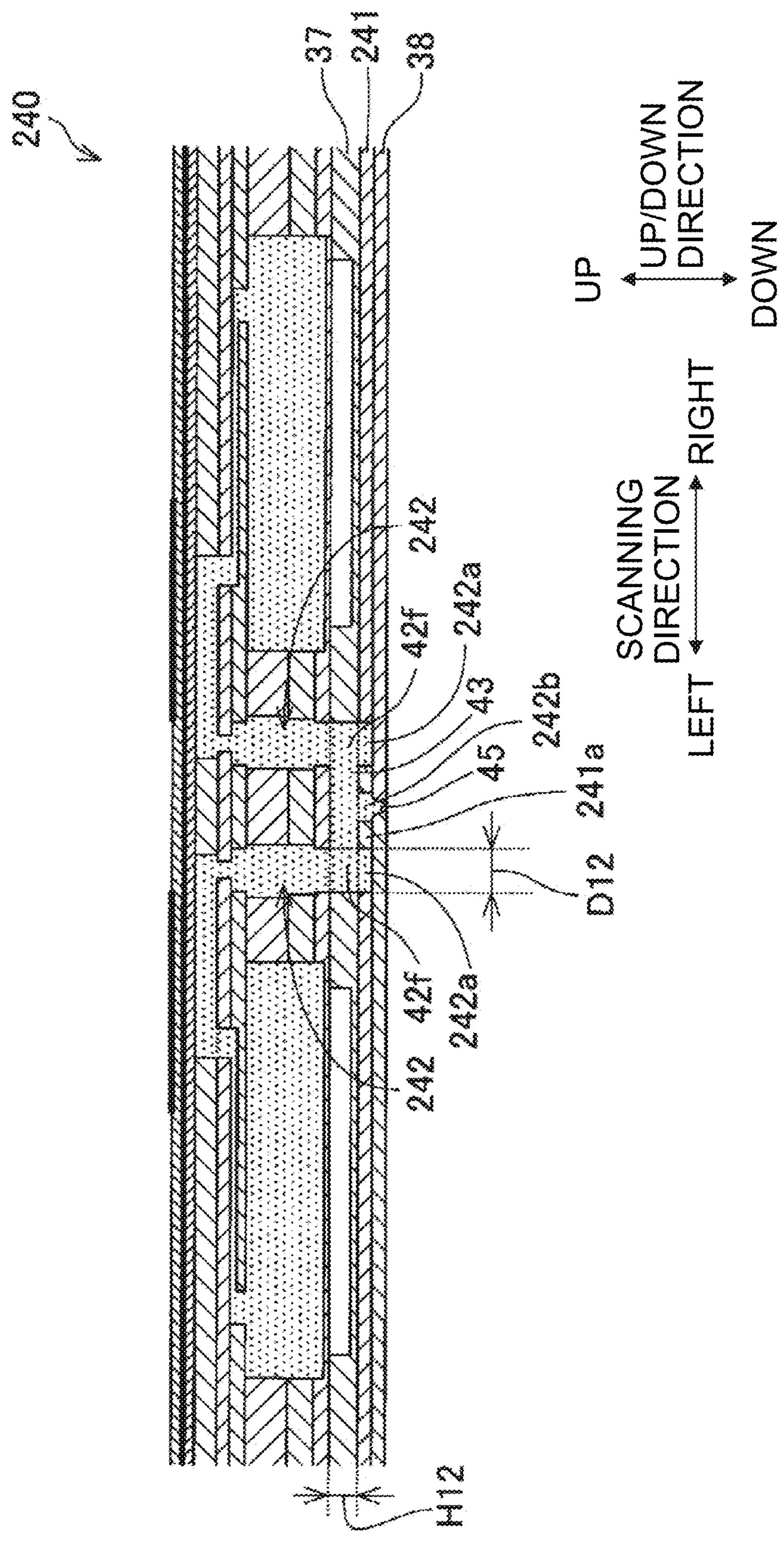
FIG. 14 is a cross-sectional view along the scanning direction, of an ink jet head according to a sixth modified embodiment.

As depicted in FIG. 14, an ink jet head 240 according to a sixth modified embodiment has such a structure that in the ink jet head 3, a plate 241 is added between the plate 37 and the plate 38. The plate 241 is formed with through holes 242*a* to form descender channels 242. Further, the plate 241 is formed with a through hole 242*b* in the part overlapping with the nozzle 45 such that the link channel 43 is in communication with the nozzle 45 through the through hole 242*b*. Further, there is a part 241*a* encompassing the through hole 242*b* of the plate 241 and separating the through holes 242*a* from the through hole 242*b*.

Then, in the sixth modified embodiment, in the same manner as in the first embodiment, the height H12 of the link channel 43 is smaller than the diameter D12 of the through hole 42*f*. On the other hand, in the sixth modified embodiment, the lower end of the link channel 43 is positioned above the lower ends of the descender channels 242. Therefore, when the link channel 43 is projected in the extending direction, the edge of the link channel is positioned at the inside of the edges of the descender channels 242. By virtue of this, in the sixth modified embodiment, the air bubbles flow readily from the link channel 43 to the descender channels 242.

Further, in the second embodiment, by positioning the lower ends (the lower edges) of the descender channels 122 and the lower end (the lower edge) of the circulation channel 123 to the same height, when the circulation channel 123 is projected along the extending direction, the lower edges of the descender channels 122 overlap with the lower edge of the circulation channel 123. However, the present teaching is not limited to that.

Figure 15:
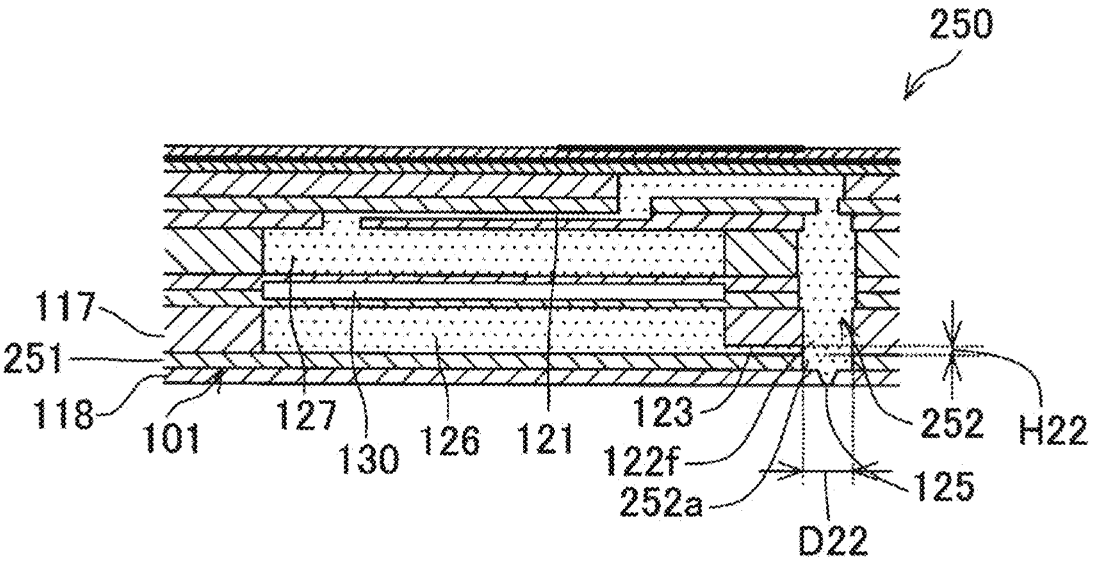
FIG. 15 is a cross-sectional view along the scanning direction, of an ink jet head according to a seventh modified embodiment.

As depicted in FIG. 15, an ink jet head 250 according to a seventh modified embodiment has such a structure that in the ink jet head 100, a plate 251 is added between the plate 117 and the plate 118. The plate 251 is formed with through holes 252*a* to form descender channels 252. Further, in the seventh modified embodiment, too, just as in the second embodiment, the height H22 of the circulation channel 123 is smaller than the diameter D22 of the through hole 122*f*. On the other hand, in the seventh modified embodiment, the lower end of the circulation channel 123 is positioned above the lower ends of the descender channels 252. Therefore, when the circulation channel 123 is projected in the extending direction, the edge of the circulation channel 123 is positioned at the inside of the edges of the descender channels 252. By virtue of this, in the seventh modified embodiment, the air bubbles flow readily from the circulation channel 123 to the descender channels 252.

Further, in the first embodiment, when the link channel 43 is projected in the extending direction, the entire link channel 43 stays within the range of the descender channel 42 (the through hole **42*f*) being arranged. However, without being limited to that, in the first embodiment, when the link channel 43 is projected in the extending direction, if at least the part of the link channel 43 connected to the descender channels 42 stays within the range of the descender channel 42 (the through hole 42*f*) being arranged, then it is possible for the air bubbles to less readily get stuck in the connected part between the descender channels 42 and the link channel 43. Likewise, in the second embodiment, when the circulation channel 123 is projected in the extending direction, when the circulation channel 123 is projected in the extending direction, if at least the part of the circulation channel 123 connected to the descender channels 122 stays within the range of the circulation channel 123 being arranged, then it is possible for the air bubbles to less readily get stuck in the connected part between the descender channels 122 and the circulation channel 123**.

Further, in the first embodiment, when the link channel 43 is projected in the extending direction, the part of the link channel 43 connected to the descender channels 42 may extend out of the range of the descender channel 42 (the through hole **42*f*) being arranged. Likewise, in the second embodiment, when the circulation channel 123 is projected in the extending and scanning direction, the part of the circulation channel 123 connected to the descender channels 122 may extend out of the range of the descender channel 122 (the through hole 122*f***) being arranged.

Further, the arrangements of the supply manifolds causing the ink to flow into the individual channels and the feedback manifolds causing the ink to flow out of the individual channels are not limited to what was explained above. For example, in the second embodiment, the supply manifolds may be arranged in positions not overlapping in the up/down direction with the feedback manifolds, on the right side of the descender channels 122. In such a case, for example, the circulation channels may be connected to the right lower ends of the side walls of the descender channels 122 to extend rightward from the connected parts with the descender channels 122 and to be connected to the supply manifolds.

Further, the above examples are explained by applying the present teaching to ink jet heads jetting ink from nozzles. However, without being limited to that, it is also possible to apply the present teaching to other liquid jetting apparatuses than ink jet heads, jetting another liquid than ink.

What is claimed is:

1. A liquid jetting apparatus, comprising:
individual channels;
a first manifold commonly provided for the individual channels; and
a second manifold commonly provided for the individual channels,
wherein each of the individual channels has:
a nozzle;
a first pressure chamber connected to the first manifold and extending along a plane orthogonal to a predetermined direction;
a second pressure chamber connected to the second manifold and extending along the plane;
a first connecting channel connected to the first pressure chamber and extending from the first pressure chamber;
a second connecting channel connected to the second pressure chamber and extending from the second pressure chamber; and
a link channel extending to be parallel to the plane, having a connected part connected to the first connecting channel and another connected part connected to the second connecting channel, linking the first connecting channel and the second connecting channel, and connected to the nozzle,
wherein a position of the link channel in the predetermined direction is different from positions of the first pressure chamber and the second pressure chamber in the predetermined direction,
wherein liquid flows from the first pressure chamber to the second pressure chamber through the link channel,
wherein the nozzle is arranged between the connected part connected to the first connecting channel and the another connected part connected to the second connecting channel in a direction in which the link channel extends,
wherein the first pressure chamber and the second pressure chamber are long in a first direction parallel to the plane, and
wherein a length of the first pressure chamber in the first direction is the same as a length of the second pressure chamber in the first direction.

2. The liquid jetting apparatus according to claim 1, wherein a length of the first pressure chamber in a second direction is the same as a length of the second pressure chamber in the second direction, the second direction being orthogonal to the first direction and parallel to the plane.

3. The liquid jetting apparatus according to claim 1, wherein a length of the first pressure chamber in the predetermined direction is the same as a length of the second pressure chamber in the predetermined direction.

4. The liquid jetting apparatus according to claim 1, wherein the first pressure chamber has the same shape as the second pressure chamber when viewed in the predetermined direction.

5. The liquid jetting apparatus according to claim 1, wherein each of the individual channels does not have three or more pressure chambers.

6. The liquid jetting apparatus according to claim 1, further comprising a damper chamber overlapping with the first manifold in the predetermined direction.

7. The liquid jetting apparatus according to claim 1, wherein
the first pressure chamber and the second pressure chamber are different in position in the second direction, and
the link channel extends in a third direction, the third direction being parallel to the plane and intersecting with the first direction and the second direction.

8. The liquid jetting apparatus according to claim 1, wherein
the first manifold and the second manifold are long in a fourth direction parallel to the plane, and
a length of the first manifold in a fifth direction is the same as a length of the second manifold in the fifth direction, the fifth direction being orthogonal to the fourth direction and parallel to the plane.

9. The liquid jetting apparatus according to claim 1, wherein a diameter of the first connecting channel is the same as a diameter of the second connecting channel.

* * * * *